US011603593B2

(12) United States Patent
Nalladega et al.

(10) Patent No.: US 11,603,593 B2
(45) Date of Patent: Mar. 14, 2023

(54) SYSTEMS AND METHODS FOR AUTOMATIC DETECTION OF COATING DEFECTS

(71) Applicant: General Electric Company, Schenectady, NY (US)

(72) Inventors: Venkata Vijayaraghava Nalladega, Watervliet, NY (US); Bernard Patrick Bewlay, Niskayuna, NY (US); Majid Nayeri, Niskayuna, NY (US); Michael Howard Rucker, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/012,485

(22) Filed: Sep. 4, 2020

(65) Prior Publication Data

US 2022/0074056 A1 Mar. 10, 2022

(51) Int. Cl.
*G01N 21/00* (2006.01)
*G01N 25/72* (2006.01)
(Continued)

(52) U.S. Cl.
CPC .............. *C23C 28/00* (2013.01); *F01D 5/182* (2013.01); *F01D 5/288* (2013.01); *G01N 21/8851* (2013.01); *G01N 25/72* (2013.01)

(58) Field of Classification Search
CPC .... G01N 25/72; G01N 21/71; G01N 21/8851; G01N 21/9501; G01N 2021/646;
(Continued)

(56) References Cited

U.S. PATENT DOCUMENTS 5,015,950 A * 5/1991 Rose ...................... G01N 25/72
324/501
5,111,048 A * 5/1992 Devitt ..................... G01N 25/72
250/342
(Continued)

FOREIGN PATENT DOCUMENTS

CN 106324034 A 1/2017
JP 2000206100 A 7/2000
(Continued)

OTHER PUBLICATIONS

Abbasi et al., NDE Inspections and Lifetime Assessment of Turbine Equipment, Siemens Energy Inc., Power-Gen International 2008, Dec. 2-4, 2008, Orlando, FL, 11 Pages.
(Continued)

*Primary Examiner* — Andre J Allen
(74) *Attorney, Agent, or Firm* — Dority & Manning, P.A.

(57) ABSTRACT

Systems and methods for automatic detection of defects in a coating of a component are provided. In one aspect, a coating inspection system is provided. The coating inspection system includes a heating element operable to impart heat to the component as it traverses relative thereto. An imaging device of the system captures images of the component as the heating element traverses relative to the component and applies heat thereto. The images indicate the transient thermal response of the component. The system can generate a single observation image using the captured images. The system can detect and analyze defects using the generated single observation image.

20 Claims, 16 Drawing Sheets

(51) Int. Cl.
*F01D 5/28* (2006.01)
*C23C 28/00* (2006.01)
*F01D 5/18* (2006.01)
*G01N 21/88* (2006.01)

(58) Field of Classification Search
CPC ......... G01N 2021/8825; G01N 21/211; G01N 21/636; G01N 21/47; G01N 21/956; G01N 21/64; G01N 21/94; G01N 21/55; G01N 21/9503; G01N 17/004; G01N 2021/4792; G01N 2021/8472; G01N 2021/8848; G01N 2021/8893; G01N 2021/8896; G01N 21/3563; G01N 21/4788; G01N 21/65; G01N 21/8422; G01N 21/88; G01N 21/9505; G01N 2203/0057; G01N 29/2418; G01N 3/317; G01N 3/56; G01N 3/60
See application file for complete search history.

(56) References Cited

U.S. PATENT DOCUMENTS

| | | | |
|---|---|---|---|
| 6,042,898 A | 3/2000 | Burns et al. | |
| 6,285,449 B1 * | 9/2001 | Ellingson | G01N 21/8851 356/369 |
| 6,364,524 B1 | 4/2002 | Markham | |
| 6,383,815 B1 | 5/2002 | Potyrailo | |
| 6,538,725 B2 | 3/2003 | Potyrailo et al. | |
| 6,874,932 B2 | 4/2005 | Devitt et al. | |
| 7,199,367 B2 | 4/2007 | Favro et al. | |
| 7,432,505 B2 | 10/2008 | Brummel | |
| 7,690,840 B2 | 4/2010 | Zombo et al. | |
| 7,716,987 B2 | 5/2010 | Sathish et al. | |
| 7,918,141 B1 | 4/2011 | Sathish et al. | |
| 8,158,428 B1 * | 4/2012 | Krishna | A61B 5/157 436/166 |
| 8,221,825 B2 | 7/2012 | Reitz et al. | |
| 8,300,232 B2 | 10/2012 | Sansom et al. | |
| 8,440,974 B2 | 5/2013 | Ruhge et al. | |
| 8,749,629 B2 | 6/2014 | Baleine et al. | |
| 8,759,770 B1 | 6/2014 | Woods et al. | |
| 9,004,753 B1 | 4/2015 | Maresca, Jr. et al. | |
| 9,080,453 B2 | 7/2015 | Shepard et al. | |
| 9,176,082 B2 | 11/2015 | Mistral | |
| 9,829,449 B2 | 11/2017 | Seok et al. | |
| 10,019,808 B2 | 7/2018 | Hewitt et al. | |
| 10,152,784 B2 * | 12/2018 | Nalladega | G06T 7/0008 |
| 10,685,433 B2 * | 6/2020 | Finn | G01N 25/72 |
| 2004/0218715 A1 * | 11/2004 | Jones | G01N 33/2045 378/57 |
| 2004/0226351 A1 * | 11/2004 | Schafrik | G01Q 60/22 73/105 |
| 2005/0073673 A1 * | 4/2005 | Devitt | G01N 21/6447 356/37 |
| 2010/0217540 A1 * | 8/2010 | Namba | C04B 38/0074 702/136 |
| 2010/0296943 A1 | 11/2010 | Lee et al. | |
| 2011/0273702 A1 * | 11/2011 | Jones | G01N 21/8422 356/51 |
| 2013/0077649 A1 * | 3/2013 | Mistral | F01D 5/288 374/4 |
| 2014/0063227 A1 | 3/2014 | Baleine | |
| 2014/0210992 A1 | 7/2014 | Zhang | |
| 2015/0043769 A1 | 2/2015 | Newman | |
| 2015/0300920 A1 * | 10/2015 | DeAscanis | G01M 15/14 356/614 |
| 2017/0254761 A1 | 9/2017 | Ahmadian et al. | |
| 2018/0005368 A1 | 1/2018 | Nalladega et al. | |

FOREIGN PATENT DOCUMENTS

| | | | |
|---|---|---|---|
| JP | 2001228105 A | 8/2001 | |
| JP | 2004012390 A | 1/2004 | |
| JP | 2006242887 A | 9/2006 | |
| JP | 2011214955 A | 10/2011 | |
| JP | 5026054 B2 | 9/2012 | |
| WO | WO-2014178056 A1 * | 11/2014 | ......... B29C 65/3656 |
| WO | WO2016105327 A1 | 6/2016 | |

OTHER PUBLICATIONS

Bison et al., Inspecting Thermal Barrier Coatings by IR Thermography, Proceedings vol. 5073, Thermosense XXV, Conference—Orlando Florida, Apr. 1, 2003, 11 Pages.

Eldridge et al., Monitoring Delamination Progression in Thermal Barrier Coatings by Mid-Infrared Reflectance Imaging, International Journal of Applied Ceramic Technology, vol. 3, Issue 2, Apr. 4, 2006, 11 Pages.

Zombo et al., Advanced NDE Systems for Flexible Operation and Maintenance of Gas Turbine Components, Siemens Power Generation, Inc., Siemens Power Generation International, Nov. 28-30, 2006, Orlando FL, 13 Pages.

Bendada A et al., "Sensitivity of thermal-wave interferometry to thermal properties of coating: application to thermal barrier coatings; Thermal-wave interferometry", Measurement Science and Technology, IOP, Bristol, GB, vol. 13, No. 12, Dec. 1, 2002, pp. 1946-1951.

Peng Yu et al., "Eddy Current Pulsed Thermography for Noncontact Nondestructive Inspection of Motor Winding Defects", IEE Sensors Journal, IEEE, USA, vol. 20, No. 5, Nov. 9, 2019, pp. 2625-2634.

* cited by examiner

SYSTEMS AND METHODS FOR AUTOMATIC DETECTION OF COATING DEFECTS

FIELD

The present subject matter relates generally to systems and methods for automatic detection of defects in coatings, such as coatings used on turbomachinery components.

BACKGROUND

Some components for power and aviation gas turbine engines are coated with a thermal barrier coating, especially components located along the hot gas path of such engines. For instance, metallic turbine blades are commonly coated with a thermal barrier coating to protect the metallic structure of the blade from thermal damage during operation. A bond coat is typically disposed between the metallic structure and the thermal barrier coating for enhancing the bond or adhesion therebetween. Generally, thermal barrier coatings can increase the useful service life of metallic high temperature components.

Detection of defects in thermal barrier coatings can ensure that only components with satisfactory coatings are assembled on an engine. Accordingly, such components are typically inspected for defects. The formation of coating defects can occur during a coating process, such as an Electron Beam Physical Vapor Deposition (EBPVD) coating process. Common coating defects include spits and pits. Spits can form when too much coating material is deposited in a localized area. Spits can disrupt fluid flow through the engine, among other drawbacks. Pits can likewise form during the coating process, or in some cases, during engine operation. Pits are voids or spaces in the coating. If spits and/or pits in a thermal barrier coating exceed a certain size, depth, number, area fraction, or some combination thereof, the coating may need to be stripped and the component may need to be recoated. Coating rework can be expensive, time consuming, and an overall inconvenience.

Present techniques for identifying defects in thermal barrier coatings are largely visual and completed manually by an operator. Moreover, such techniques are subjective and are not quantitative. Thus, in using present techniques, some components that should be stripped and recoated pass quality inspection while some components that have satisfactory thermal barrier coatings do not pass quality inspection and are stripped and recoated. Thus, resources are wasted and additional expenses are incurred.

Accordingly, systems and methods that address one or more of the challenges noted above would be useful. Particularly, improved systems and methods for assessing the quality of thermal barrier coatings used on high temperature applications would be beneficial.

BRIEF DESCRIPTION

Aspects of the present disclosure are directed to distributed control systems and methods of controlling turbomachines. Aspects and advantages of the invention will be set forth in part in the following description, or may be obvious from the description, or may be learned through practice of the invention.

In one aspect, a system is provided. The system includes a heating element, an imaging system having an imaging device, and a computing system having one or more processors and one or more memory devices. The one or more processors are configured to: cause the heating element to traverse relative to a component having a coating; cause the heating element to heat the component as the heating element traverses relative to the component; cause the imaging device to capture a plurality of images of the component as the heating element traverses relative to the component and applies heat thereto, the plurality of captured images indicating a transient thermal response of the component; and detect one or more coating defects in the coating of the component based at least in part on the transient thermal response of the component captured in the plurality of images.

In another aspect, a method is provided. The method includes traversing a heating element relative to a component having a coating. The method also includes heating the component with the heating element as the heating element traverses relative to the component. Further, the method includes capturing, with an imaging device, a plurality of images of the component as the heating element traverses relative to the component and applies heat thereto, the captured plurality of images indicating a transient thermal response of the component. In addition, the method includes detecting one or more coating defects in the coating of the component based at least in part on the transient thermal response of the component captured in the plurality of images.

In a further aspect, a non-transitory computer readable medium is provided. The non-transitory computer readable medium comprising computer-executable instructions, which, when executed by one or more processors of a computing system of a coating inspection system, cause the one or more processors to: cause a heating element of the coating inspection system to traverse relative to a component having a coating; cause the heating element to heat the component as the heating element traverses relative to the component; cause an imaging device of the coating inspection system to capture a plurality of images of the component as the heating element traverses relative to the component and applies heat thereto, the plurality of captured images indicating a transient thermal response of the component; and detect one or more coating defects in the coating of the component based at least in part on the transient thermal response of the component captured in the plurality of images.

These and other features, aspects and advantages of the present invention will become better understood with reference to the following description and appended claims. The accompanying drawings, which are incorporated in and constitute a part of this specification, illustrate embodiments of the present subject matter and together with the description serve to explain the principles of the present subject matter.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
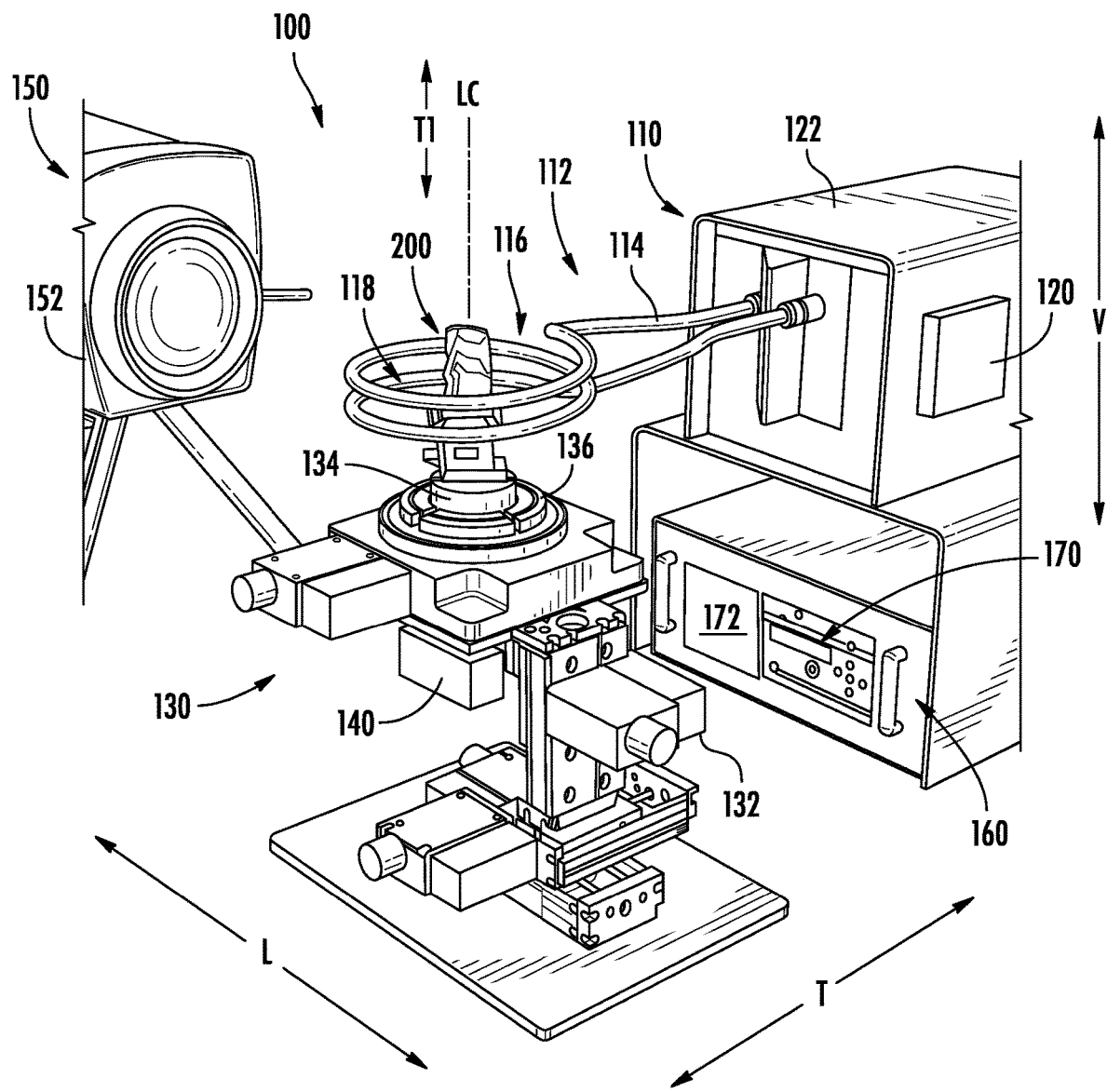
FIG. 1 provides a perspective view of a coating inspection system according to one embodiment of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows.

Generally, the present disclosure provides a system and a method for detecting defects in coatings used on components of turbomachines, such as aviation and power gas turbine engines. The system includes features that improve the detectability of defects, such as spits and pits, in coatings with better accuracy compared to conventional systems/techniques. The system and methods of the present disclosure can provide a faster, more accurate, and non-contact method of determining the quality of a coating of a component, such as a thermal barrier coating (TBC) of a metallic turbine blade.

In one aspect, a coating inspection system for automatic detection of defects in a barrier coating of a component is provided. For instance, the component can be a metallic component of a gas turbine engine and the barrier coating can be a non-electrically conducting coating, such as a thermal barrier coating. The coating inspection system includes a heating element for imparting heat to the component. The heating element is movable relative to the component. In this way, the heating element can traverse relative to the component as the heating element applies heat to the component. The component can be held in place by a platform system. The system also includes an imaging device for capturing images of the thermal response of the component as the heating element traverses relative to the component and applies heat thereto. The imaging device can be an infrared (IR) imaging device (e.g., IR camera), for example. Notably, as the heating element traverses and heats the component, transient thermal gradients are created between non-defect and defect regions of the barrier coating due to the difference in the heat radiating outward from non-defect regions of the coating and the heat radiating outward from defects in the barrier coating. The imaging device can capture these transient thermal responses. The imaging device can capture the transient thermal responses as the heating element actively heats the component and/or as the component cools down after being heated. Transient thermal gradients can appear prominently by heating the component by 10-15 degrees Fahrenheit or more relative to the ambient temperature.

The system also includes a computing system having one or more processors and one or more memory devices. The computing system is communicatively coupled with the imaging device and the heating element. The one or more processors are configured to cause the heating element to traverse relative to the component and to cause the heating element to heat the component as the heating element traverses relative to the component. The traversing heating element causes the component to exhibit a transient thermal response as noted above. The one or more processors are further configured to cause the imaging device to capture a plurality of images of the component as the heating element traverses relative to the component and applies heat thereto. In this way, the captured images indicate a thermal response of the component. The one or more processors can detect one or more coating defects in the barrier coating of the component based at least in part on the thermal response of the component captured in the plurality of images. In some embodiments, the one or more processors can generate a single observation image from the plurality of captured images such that the thermal response of the component (or a particular perspective or orientation of the component) is represented in a single image. This may facilitate detection of defects and analysis of the thermal response of the component.

Further, in some embodiments, the computing system is communicatively coupled with an airflow generator. The one or more processors can cause the airflow generator to pulse air into one or more interior passages of the component. This may enhance the thermal response of the component, making the thermal response of the component easier for the imaging device to capture. Methods of automatic defect detection in a non-electrically conducting coating of a component are also provided.

Accordingly, the systems and methods described herein leverage the transient nature of the thermal response of a component to detect spits and pits in the non-conducting coating of the component. To summarize, as the heating element traverses relative to a particular section of the component, electric currents are induced in the conductive substrate of that section by a pulsed Alternating Current (AC) directed through the heating element, e.g., for few seconds, which in turn generates heat in the conducting substrate radiating through the non-conducting coating. The thermal response of the component, or that particular section of the component, is detected by the high-speed imaging device (e.g., IR camera). Particularly, the transient heat field interacts with defects in the section of the component, causing localized thermal contrast differences or gradients, which can be imaged or captured by the IR camera. As the heating element traverses relative to the component and applies heat thereto, the IR camera can capture the localized thermal response of some or all sections of the component.

Advantages of the present system and method include the ability to improve the detectability and quantification of defects through enhanced contrast at defects due to the transient nature of the inspection. Notably, the transient nature of the inspection improves detectability of smaller defects, which have not been detectable with existing IR thermography methods and/or steady state heating methods. For instance, utilizing the present system and method, spits and pits as small as 10 mils in a coating are detectable. Specifically, spits and pits of 10 mils to 7 mils can be detected. Detection of such small defects is made possible due to the generation of transient thermal gradients compared to conventional systems and methods. The transient thermal gradients enhance the contrast between defect and non-defect regions of the coating of the component in the captured images.

Various parameters can affect the detectability and the quantification of defects. For instance, one parameter that can affect the detectability of defects is the frame rate of the imaging device (e.g., IR camera). Higher frame rates allow capture of transient thermal gradients at the defects with better thermal contrast, particularly when detecting smaller defects (e.g. less than 10 mils) since the thermal gradient changes near small defects tend to disappear faster. In some example embodiments, the imaging device of the coating inspection system has a frame rate of at least 60 Hz. In some embodiments, the imaging device of the coating inspection system has a frame rate between 60-500 Hz. In some embodiments, the imaging device of the coating inspection system has a frame rate between 250-500 Hz.

Another parameter that can affect the detectability of defects is the spatial resolution of the imaging device. In some embodiments, the imaging device has a spatial resolution such that the imaging device is operatively configured to detect defects or features as small as 80 microns (or about 0.003 inches). In such embodiments, for example, the imaging device can have a 25 mm lens and a 640×512 pixel detector IR camera. The working distance between the IR detector and the component can be set at 6 inches. In other embodiments, the imaging device can detect defects or features smaller than 80 microns (or about 0.003 inches) with use of a 1024×1024 pixel detector IR camera and/or by decreasing the working distance between the IR detector and the component, e.g., to be less than 6 inches (subject to the minimum working distance requirements for the lens and IR detector).

A further parameter that can affect the detectability of defects is the wavelength of the imaging device. In some example embodiments, the imaging device is a mid-wave IR camera (e.g., 3-6 µm). In some example embodiments, the imaging device is a long wavelength IR camera (e.g., 7-14 µm). In some embodiments, the imaging device is one of at least two imaging devices of the system. At least one of the imaging devices can be a mid-wave IR camera (e.g., 3-6 µm) and at least of the imaging devices can be a long wavelength IR camera (e.g., 7-14 µm). Another parameter that can affect the detectability of defects is the thermal sensitivity of the imaging device. In some example embodiments, the thermal sensitivity of the imaging device (e.g., an IR camera) is between 18-50 mK. This range allows for detection of smaller temperature differences or less steep gradients, and consequently, an imaging device having a thermal sensitivity range between 18-50 mK provides an enhanced ability to detect smaller defects.

Yet another parameter that can affect the detectability of defects is the velocity of the heating element. That is, the speed and direction of the heating element with respect to the stationary component is one parameter that affects detectability. In some embodiments, as noted above, the heating element (e.g., an energized induction coil) is moved or traversed relative to the stationary component. On one hand, if the velocity of the heating element is too slow, the component and coating thereof can reach or approach steady-state conditions. That is, if the velocity of the heating element is too slow, the component can become uniformly heated, which can adversely affect detection of defects as the transient thermal gradients become "washed out" by the uniform heating of the component. On the other hand, if the velocity of the heating element is too fast, the thermal contrast near the defect(s) may not generate to a sufficient degree for detection. In addition, the faster the heating element traverses relative to the component, the faster the frame rate of the imaging device needs to be to capture the thermal gradients. In some example embodiments, the heating element is traversed or moved relative to the component for detection of spits and pits is between 2-5 cm/s.

Other parameters that can affect the detectability of defects includes the heating rate and duration of heating. The heating rate is directly affected by the velocity of the heating element relative to the component (see above) as well as characteristics of the electric current directed to the heating element (e.g., the frequency of the AC current). The duration of heating is dependent on the size of the component (e.g., the thickness of the substrate of the component). If the duration of heating is too long, the transient thermal gradients become washed out. If the duration of heating the component is too fast, the imaging device may not be able to capture the gradients. Further, in some embodiments, the imaging device includes a detector that measures counts. The counts per period of time are representative of a measure of temperature of the target surface. In such embodiments, a component (e.g., a turbine blade having a TBC) can be heated at a rate from 45 counts/sec-300 counts/sec. The heating rate is a function of the thickness of the part, material conductivity, and coating thickness variations. Generally, thinner regions heat up faster than thicker regions, for example. Components can cool at a rate from 45 counts/sec-300 counts/sec.

In another aspect, systems and methods of generating a single observation image from a plurality of captured images is provided. That is, all localized thermal transients captured by the imaging device in a plurality of images or video can be compiled into a single summarizing image. Particularly, during a coating inspection of a component having a barrier coating, an imaging device can capture images of the component as a heating element traverses relative to the component and applies heat thereto. The imaging device can be an infrared imaging device, for example. The captured images (e.g., collectively an IR video) are received by one or more processors of the computing system. The received images capture the component from the same perspective. The received images also capture the thermal profile of the component in response to the heating element sweeping past and heating the component.

The one or more processors are configured to generate a plurality of masked images using the received captured images. Specifically, in some implementations, a masking window is positioned adjacent to and forward of the heating element along the traversing direction in each captured image. In other implementations, a masking window is positioned adjacent to and backward of the heating element along the traversing direction in each captured image. In yet other implementations, a masking window includes two sections, including a forward section and a back section. In such implementations, the forward section of the masking window is positioned adjacent to and forward of the heating element along the traversing direction in each captured image and the back section of the masking window is positioned adjacent to and backward of the heating element along the traversing direction in each captured image. The forward and back sections can be non-contiguous sections in such implementations. As the heating element moves frame by frame or image by image relative to the component the masking window is moved or positioned accordingly frame by frame or image by image. The masking window masks the pixels outside of its perimeter. In this way, pixels outside of the masking window are ignored.

Thermal data (e.g., temperature data) is applied to the pixels within the masking window of each image. Thermal data can be applied to each pixel within a given masking window. With the masked images generated, the one or more processors determine a maximum or minimum value (e.g., a maximum or minimum temperature value) for each pixel over the masked images. That is, all or some pixels can be represented in multiple masked images because the masking windows may be positioned such that they include some of the same pixels. The one or more processors can consider a value (e.g., temperature values) for a particular pixel over multiple masked images and can determine the maximum or minimum value for that particular pixel. Stated another way, the maximum or minimum value associated with each pixel in the masked images is determined.

Once a maximum or minimum value is selected for each pixel over the masked images, the single observation image is generated. The pixels selected for inclusion in the two-dimensional single observation image are those representing the maximum or minimum value for their respective pixels. Thus, the single observation image depicts the thermal response in an enhanced and easy to analyze manner. Further, as pixels are selected from among the pixels of the masked images, the heating element is not present in the single observation image. So, despite the imaging device capturing the heating element traversing relative to the component as it applies heat to the component to capture the transient thermal response, the single observation image does not include or only negligibly includes the heating element footprint. This may offer a cleaner image and may facilitate analysis of the thermal response of the component.

Figure 2:
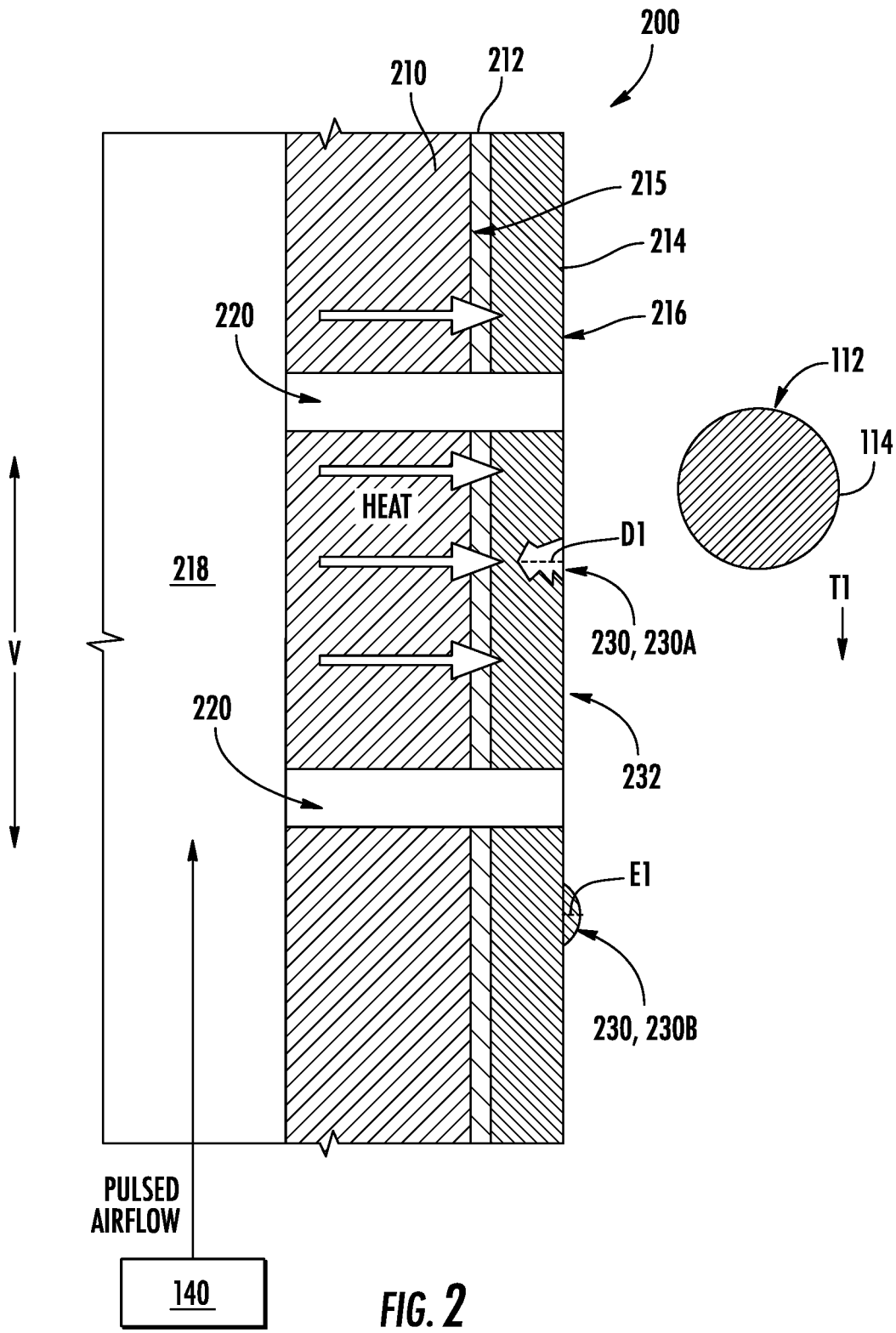
FIG. 2 provides a close-up, schematic cross-sectional view of a portion of a component being inspected by the system of FIG. 1.

Systems and Methods for Automatic Detection of Defects in a Coating of a Component Referring now to FIGS. 1 and 2, FIG. 1 provides a perspective view of a coating inspection system 100 according to one embodiment of the present disclosure. FIG. 2 provides a close-up, schematic cross-sectional view of a portion of a component 200 undergoing a coating inspection by the system 100 of FIG. 1. Generally, the system 100 is operatively configured to detect defects in a barrier coating of a component. For instance, the system 100 is operable to detect defects in a thermal barrier coating (TBC) of a metallic component of a gas turbine engine, such as a turbine blade or vane of a nozzle. Moreover, the system 100 is configured to detect various types of coating defects, including without limitation, spits, pits, delaminations, as well as other types of cracks and surface imperfections. While the component 200 is described herein as a metallic turbine blade for an aviation gas turbine engine, it will be appreciated that the system 100 described herein is not limited to detecting defects in turbine blades but rather is configured to detect defects in other types of metallic components having a barrier coating as well.

In FIG. 1, the component 200 is shown undergoing a coating inspection by the system 100. For this embodiment, the component 200 is a high-pressure turbine blade of an aviation gas turbine engine. As depicted in FIG. 2, the component 200 has a metallic structure 210. The metallic structure 210 can be formed of a nickel superalloy or another suitable high temperature metallic material, for example. The component 200 also has a metallic bond coat 212 and a barrier coat 214. The metallic bond coat 212 is disposed between an outer surface 215 of the metallic structure 210 and the barrier coat 214. Thus, the barrier coat 214 is the exterior or top coat of the component 200. The barrier coat 214 has an outer surface 216. The barrier coat 214 can be a non-conducting barrier coating. For instance, the barrier coat 214 can be a ceramic thermal barrier coating. The metallic bond coat 212 facilitates adhesion or bonding between the barrier coat 214 and the metallic structure 210 of the component 200. The metallic bond coat 212 can be applied to the metallic structure 210 in any suitable manner. Likewise, the barrier coat 214 can be applied to the metallic bond coat 212 in any suitable manner, such as by an Electron Beam Physical Vapor Deposition (EBPVD) coating process.

As further illustrated in FIG. 2, the component 200 defines one or more internal or interior passages 218, such as one or more interior cooling channels. Further, the component 200 defines one or more cooling holes 220. The one or more cooling holes 220 provide fluid communication between the interior passages 218 and the exterior environment of the component 200. For example, when the component 200 is positioned within a hot gas path of a gas turbine engine, cooling fluid can flow through the interior passages 218 and downstream through the cooling holes 220 and into the hot gas path. In this manner, the component 200 can be cooled during operation of the gas turbine engine.

Returning specifically to FIG. 1, the system 100 will now be described in detail. For this embodiment, the system 100 includes a heating system 110, a platform system 130, an airflow generator 140, an imaging system 150, and a computing system 160. For reference, the system 100 of FIG. 1 defines a vertical direction V, a lateral direction L, and a transverse direction T. The vertical direction V, the lateral direction L, and the transverse direction T are mutually perpendicular to one another and form an orthogonal direction system.

The heating system 110 of system 100 includes one or more heating elements 112 operatively configured to impart heat to a component undergoing inspection. For instance, as illustrated in FIG. 1, the one or more heating elements 112 are configured to heat the component 200. For this embodiment, the one or more heating elements 112 include an electric heating coil 114. The heating coil 114 can be formed of copper or another suitable conducting material, for example. The heating coil 114 can include or form a spiral or helical heating portion 116, e.g., at its distal end. The helical heating portion 116 defines a heating zone 118 that is sized to receive the component 200. That is, the helical heating portion 116 of the heating coil 114 is sized so that the component 200 can be received within the heating zone 118. In this way, the heating coil 114 can completely encompass or surround the component 200. This may allow for image capture of multiple sides of the component simultaneously, assuming multiple image devices are utilized. In other embodiments, the heating coil 114 can have other suitable shapes or geometries for heating the component 200 during coating inspection.

With reference to FIGS. 1 and 2, the heating coil 114 is electrically connected to a power source 120. The power source 120 can be any suitable source of electrical power. For instance, the power source 120 can be a battery, a line voltage, some combination thereof, etc. When the heating coil 114 is excited by the flow of electric current provided by the power source 120, heat radiates from the heating coil 114. The radiating heat can induce Eddy currents in the metallic structure 210 of the component 200. In this manner, the heating coil 114 can inductively heat the component 200. As the barrier coat 214 of the component 200 is a non-electrically conductive coat in this example embodiment, the Eddy currents do not flow through the barrier coat 214. Heat radiates outward from the metallic structure 210 and the metallic bond coat 212 through the barrier coat 214 and ultimately to the exterior of the component 200 as shown in FIG. 2. As will be explained in more detail herein, differing thermal responses are created due to the difference in the heat radiating or emitted outward from non-defect regions 232 of the barrier coat 214 and the heat radiating outward from defects 230 or defect regions in the barrier coat 214. The system 100 can sense or capture these transient thermal responses and detect defects in the barrier coat 214 accordingly.

The heating system 110 also includes a servomotor 122. When commanded (e.g., by one or more electrical signals received from a control device), the servomotor 122 can move the heating coil 114 relative to the component 200. Thus, the heating coil 114 is movable relative to the component 200. In this example embodiment, the heating coil 114 is movable along a traversing direction T1 relative to the stationary component 200. In FIG. 1, the traversing direction T1 extends along or is parallel with the vertical direction V. Accordingly, the heating coil 114 can inductively heat the component 200 as it traverses relative to or over the component 200 along the traversing direction T1. In this way, the entire length of the component 200 can be inductively heated. It will be appreciated that the traversing direction T1 need not be parallel with or extend along the vertical direction V and may extend along other directions as well. Notably, the heating coil can 114 traverse relative to the component 200 and apply heat thereto without contacting the component 200.

By moving the heating coil 114 along the traversing direction T1 relative to the component 200, transient thermal gradients can be created and captured by the imaging system 150. The thermal gradients are transient in that they are generated for an instant or for a relatively short period of time as the heating coil 114 traverses over and heats that particular area of the component 200. Thus, the transient thermal gradients come relatively quickly into and out of existence. Accordingly, a thermal response of a component is transient in that capturing the response is time sensitive with respect to when the heating coil 114 traverses relative to and heats the component 200.

In some alternative embodiments, the heating system 110 can be operatively configured to generate thermal gradients within the barrier coating 214 of the component 200 between defect regions 230 and defect-free regions 232. In such embodiments, various suitable types of heating elements can be utilized, including optical heating elements, laser heating elements, electromagnetic heating elements (e.g., microwave heating elements).

The platform system 130 of system 100 includes a platform 132. For this embodiment, the platform 132 is a multi-axis platform that is movable along multiple axes. Particularly, for this embodiment, the platform 132 is translatable along the vertical direction V, the lateral direction L, and the transverse direction T. The platform system 130 includes a component holder 134 or bracket operable to hold the component 200 in place, e.g., during inspection. In some embodiments, the component 200 can be loaded and/or unloaded manually into and/or from the component holder 134. In other embodiments, a robotic arm or other automation device can load and/or unload the component 200 into and/or from the component holder 134. For the illustrated embodiment of FIG. 1, the component holder 134 is operatively coupled with the platform 132 via a rotary table 136. The rotary table 136 is operable to rotate about an axis of rotation, e.g., a longitudinal centerline LC. In this way, the component holder 134 and the component 200 secured thereby can be rotated about the axis of rotation. This may allow for the component 200 to be oriented relative to imaging devices or heating coil 114 during inspection, among other benefits.

In some embodiments, when commanded (e.g., by one or more electrical signals from a control device), the platform system 130 (e.g., via multi-axis platform 132 and/or rotary table 136) is configured to move the component 200 relative to the heating coil 114. For instance, the multi-axis platform 132 can initially position the component 200 relative to the heating coil 114, e.g., so that the component 200 is centered or substantially centered along the longitudinal axis LC defined by the helical heating portion 116 of the heating coil 114. In this way, the heating coil 114 can sweep or traverse over the component 200 along the traversing direction T1 to inductively heat the component 200 during an inspection process. The rotary table 136 can be controlled to orient the component 200 to the desired orientation, e.g., for inspecting a particular side of the component 200. In some alternative embodiments, the platform system 130 can be configured to move the component 200 relative to the heating coil 114 (e.g., via platform 132 and rotary table 136), wherein the heating coil 114 is kept or controlled to remain in a fixed position. Thus, in some embodiments, the component 200 can be moved by the platform system 130 relative to the fixed heating coil 114.

In some embodiments, the system 100 optionally includes airflow generator 140. For this embodiment, the airflow generator 140 is mounted to the platform system 130.

However, in other embodiments, the airflow generator 140 is separate from the platform system 130. The airflow generator 140 is operable to move air through, across, or otherwise about the component 200, e.g., as the heating coil 114 is traversing and heating the component 200. For instance, as shown in FIG. 2, the airflow generator 140 can move air through one or more of the interior passages 218 of the component 200. Accordingly, the airflow generator 140 is in fluid communication (e.g. airflow communication) with the interior passages 218 of the component 200. For example, one or more conduits can fluidly couple the airflow generator 140 with the interior passages 218 of the component 200. The conduits can be routed internally through the platform 132, the rotary table 136, and component holder 134 or can be routed externally to the interior passages 218 of the component 200.

In some embodiments, the airflow generator 140 can be configured to pulse air through one or more of the interior passages 218 of the component 200. In this way, improved detectability of defects (e.g., pits and spits) can be achieved, especially around functionally important features. Functionally important features of a component can include, without limitation, the leading and/or trailing edge of a blade or nozzle, a tip of a blade, the areas proximate a cooling hole, etc. The airflow generator 140 can be controlled to pulse volumes of air at a predetermined frequency or interval. For instance, the predetermined frequency can range from $10^{-2}$ to $10^2$ Hz. A frequency selected from this range can facilitate enhancement of the transient thermal response of the component 200. Further, the airflow generator 140 can be controlled to provide a predetermined volume of air with each pulse. In some embodiments, ambient air can be drawn into the airflow generator 140 and pulsed into or through the component 200. In other embodiments, the airflow generator 140 is in fluid communication with a pressurized air source (not shown). The airflow generator 140 can receive the pressurized air from the pressurized air source and can pulse the pressurized air into or through the component 200 at the predetermined frequency and volume.

As further depicted in FIG. 1, the imaging system 150 of system 100 has one or more imaging devices or sensors. For this embodiment, the one or more imaging devices include an imaging camera 152. The imaging camera 152 is an Infrared (IR) camera in this example embodiment. The imaging camera 152 is operatively configured to capture a plurality of images (i.e., a collection of still images or video) of the component 200 as the heating coil 114 heats and traverses relative to the component 200 along the traversing direction T1, and in some instances, as the airflow generator 140 pulses air through the interior passages 218 of the component 200. In this way, the imaging camera 152 can detect the transient thermal response of the component 200. That is, the imaging camera 152 is configured to capture a plurality of images or a video having a plurality of frames of an instantaneous temperature profile of the component 200 as the heating coil 114 traverses over and inductively heats the component 200.

In some embodiments, the imaging camera 152 can be a mid-wavelength IR camera. A mid-wavelength IR camera can capture wavelengths in a range of about three to six micrometers (or microns) (3-6 μm). Notably, using a mid-wavelength IR camera, the barrier coat 214 is transparent or substantially transparent. Accordingly, the mid-wavelength IR camera can be used to capture defects in the metallic structure 210 and/or the metallic bond coat 212. In yet other embodiments, the imaging camera 152 can be a long wavelength IR camera. A long wavelength IR camera can capture wavelengths in a range of about six to fourteen micrometers (or microns) (6-14 μm). Using a long wavelength IR camera, the barrier coat 214 is opaque or substantially opaque. Accordingly, the long wavelength IR camera can be used to capture defects in the metallic bond coat 212 and the barrier coat 214. Further, in some embodiments, the imaging system 150 includes a mid-wavelength IR camera and a long wavelength IR camera. In this way, the mid-wavelength IR camera can capture defects in the metallic structure 210 and/or the metallic bond coat 212 and the long wavelength IR camera can capture defects in the metallic bond coat 212 and the barrier coat 214 of the component 200. This may facilitate determining which structure or coat a defect is initiating, whether the defect propagates through the metallic structure 210 or just through the coatings 212, 214, and can generally provide information useful for making lifting estimates of the component 200.

Further, in some example embodiments, the imaging camera 152 has a thermal sensitivity of between 18-50 mK. This range allows for detection of smaller temperature differences or less steep gradients, allowing for detection of smaller defects. In addition, in some example embodiments, the imaging camera 152 has a frame rate of at least 60 Hz. In some embodiments, the imaging camera 152 of the has a frame rate between 60-500 Hz. In some embodiments, the imaging camera 152 has a frame rate between 250-500 Hz. Such frame rates may allow for detection of smaller defects (e.g., defects less than 10 mils) since the thermal gradient changes near small defects tend to disappear faster. In some embodiments, the imaging camera 152 can detect defects or features as small as 80 microns (or about 0.003 inches).

Figure 12:
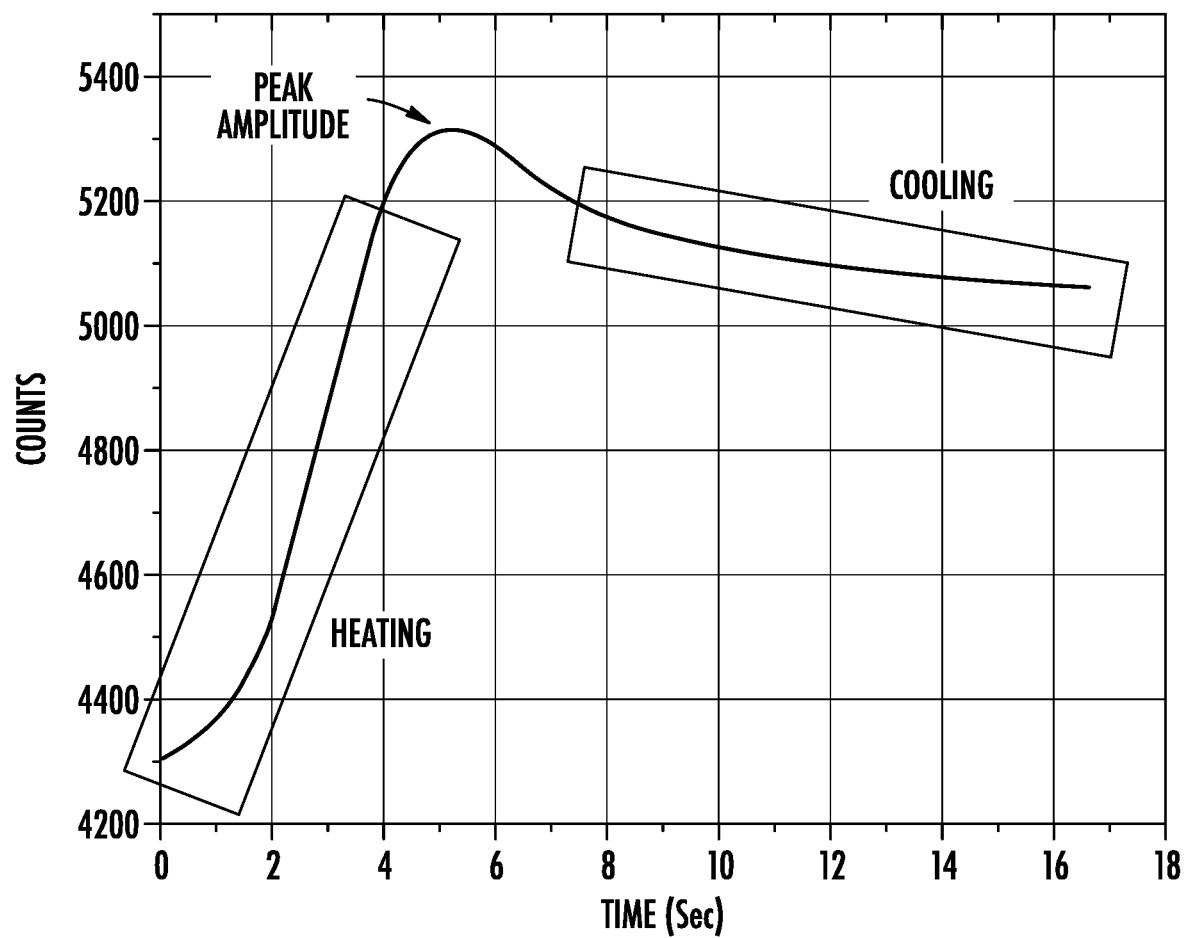
FIG. 12 provides a graph depicting a time-temperature curve for a pixel according to one embodiment of the present disclosure.
Figure 13:
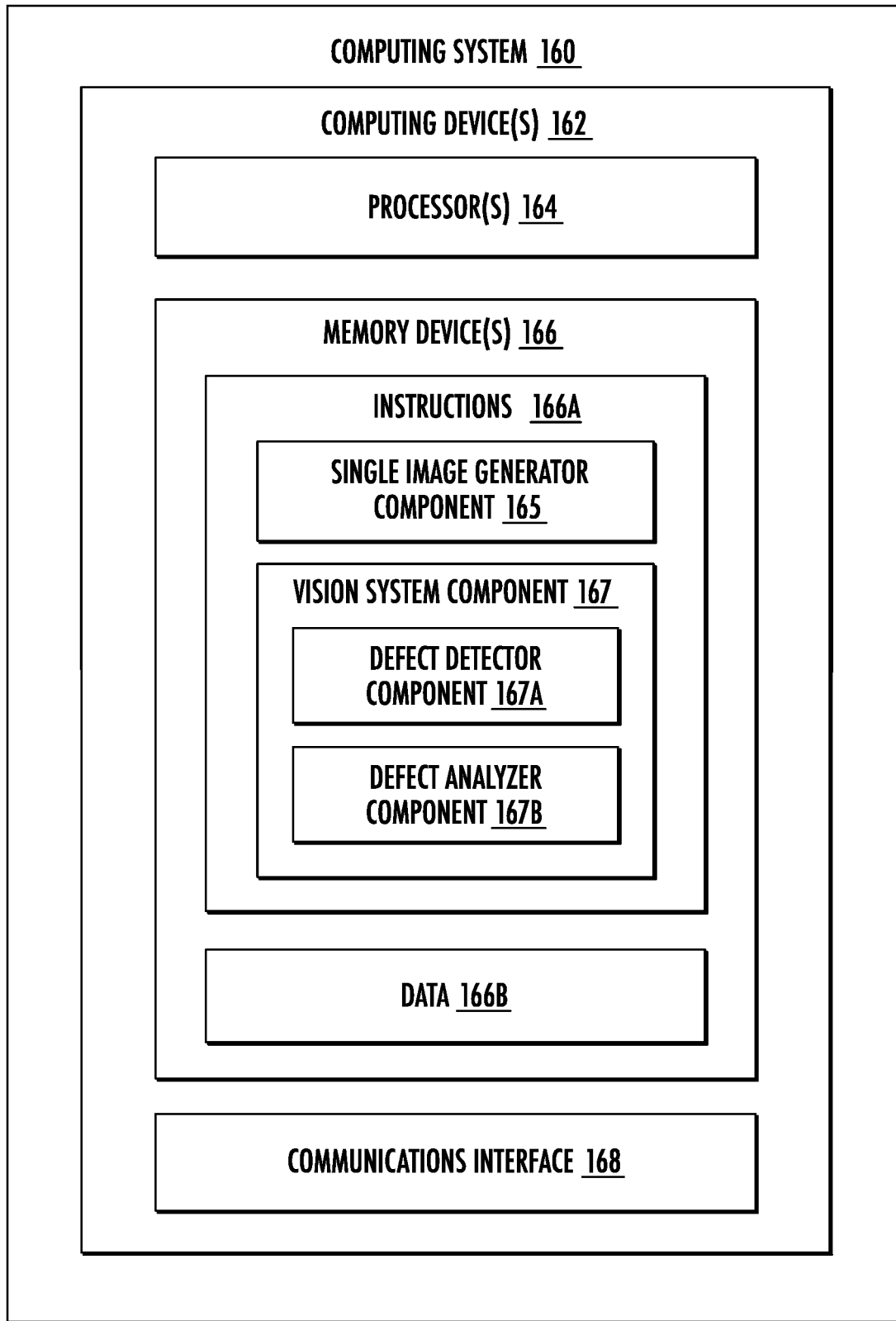
FIG. 13 provides a block diagram of a computing system of the coating inspection system of FIG. 1.

The computing system 160 of system 100 can include one or more processor(s) and one or more memory device(s), e.g., embodied in one or more control or computing devices (see FIG. 12). The one or more processor(s) can include or be any suitable processing device, such as a microprocessor, microcontroller, integrated circuit, logic device, and/or other suitable processing device. The one or more memory device(s) can include one or more computer-executable or computer-readable media, including, but not limited to, non-transitory computer-readable media, RAM, ROM, hard drives, flash drives, and/or other memory devices. The one or more memory device(s) can store information accessible by the one or more processor(s), including computer-readable instructions that can be executed by the one or more processor(s). The instructions can be any set of instructions that when executed by the one or more processor(s), cause the one or more processor(s) to perform operations, such as any of the operations and functions for which the one or more processors are configured, such as activating and controlling various aspects of the system 100. The instructions can be software written in any suitable programming language or can be implemented in hardware. Additionally or alternatively, the instructions can be executed in logically and/or virtually separate threads on the one or more processor(s).

The memory device(s) can store data that can be accessed by the one or more processor(s). For example, the data can include settings for thermally analyzing components, heat signatures, etc. The data can also include other data sets, parameters, outputs, information, etc. shown and/or described herein. The one or more processors can be in communication with a communication interface for communicating, for example, with the other components of the system 100. The communication interface can include any suitable components for interfacing with one or more network(s) or electronic components, including for example, transmitters, receivers, ports, controllers, antennas, and/or other suitable components. The communication interface can be used to communicate with other electronic devices over one or more networks, such as a local area network (LAN), a wide area network (WAN), a VHF network, a HF network, a Wi-Fi network, a WiMAX network, a gatelink network, and/or any other suitable communications networks. The communication interface can communicate over one or more networks using a wide variety of communication protocols. The communication interface can include a data bus or a combination of wired and/or wireless communication links that communicatively couple the one or more processor(s) with other electronic devices.

Particularly, the one or more processors of the computing system 160 can be communicatively coupled with various systems/devices of the system 100. For instance, the one or more processors can be communicatively coupled with the heating system 110, the platform system 130, the airflow generator 140, the imaging system 150, among other possible systems or devices thereof. The one or more processors can be communicatively coupled with these various systems and/or devices thereof by one or more wired and/or wireless communication links.

The system 100 can also include a user interface 170. The user interface 170 is provided for user control of the system 100. For example, user interface 170 includes a plurality of user controls (not labeled). The user controls can include one or more of a variety of electrical, mechanical or electromechanical input devices including rotary dials, push buttons, and touch pads and/or screens. User interface 170 can include one or more display devices 172, such as a digital or analog display device designed to provide feedback or results of the inspection process to users.

Figure 3:
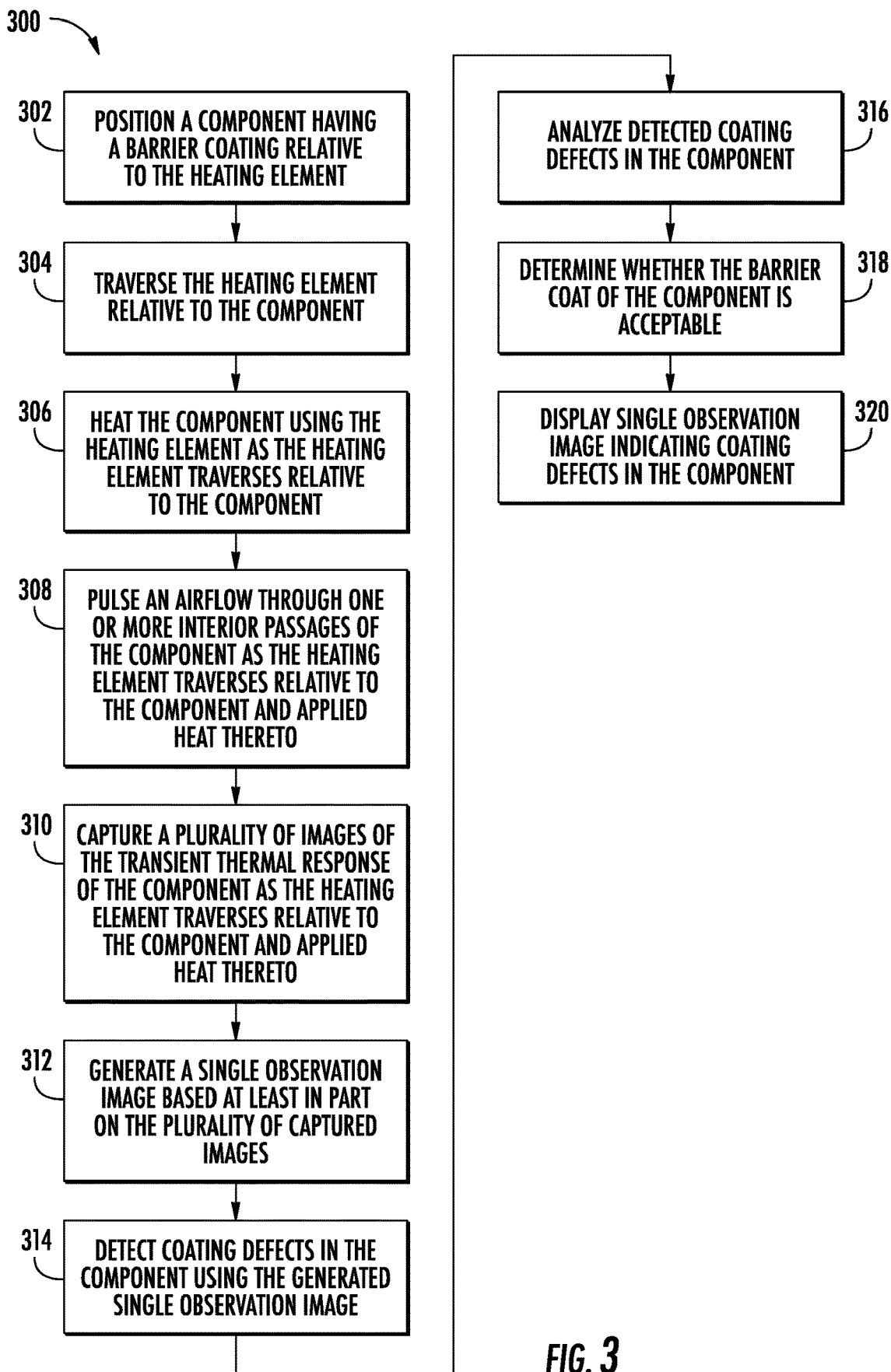
FIG. 3 provides a flow diagram of an example method in which the system of FIG. 1 can perform a coating inspection process of a component.

FIG. 3 provides a flow diagram of an example method (300) in which the system 100 of FIG. 1 may perform a coating inspection process of a component, e.g., to detect defects in a barrier coating thereof. That is, after a component is coated with a barrier coating, the component and the barrier coating thereof can be inspected by system 100 in the manner described in FIG. 3. FIG. 3 depicts actions performed in a particular order for purposes of illustration and discussion. Those of ordinary skill in the art, using the disclosures provided herein, will understand that various actions of any of the methods disclosed herein can be modified in various ways without deviating from the scope of the present disclosure. Reference will be made to various features of system 100 and component 200, and thus, reference will be made generally to FIGS. 1, 2, and 3 as well as other figures specifically noted.

At (302), the method (300) includes positioning a component having a barrier coating relative to a heating element. For instance, the component 200 having the barrier coat 214 can be positioned relative to the heating element 112 of heating system 110. In some implementations, the component 200 can be loaded manually into the component holder 134 of the platform system 130. In other implementations, a robotic arm or other automation device can load the component 200 into the component holder 134. Once the component 200 is secured in the component holder 134, the rotary table 136 can rotate the component 200 about its axis of rotation to orient the component 200 relative to the imaging camera 152 of the imaging system 150. For instance, it may be desirable to orient a particular side (e.g., a pressure or suction side of a turbine blade) or edge (e.g., a leading or trailing edge of a turbine blade) of the component 200 relative to the imaging camera 152.

At (304), the method (300) includes traversing a heating element relative to the component having the barrier coating. For instance, one or more processors of the computing system 160 can cause the heating element 112 to traverse relative to the component 200 along the traversing direction T1. By way of example, upon receiving an input (e.g., a user input or an input from a sensing device indicating that the component 200 is in position for inspection and that inspection of the component 200 is to commence), the one or more processors of the computing system 160 can cause the servomotor 122 to move the heating element 112 along the traversing direction T1, which is a direction along the vertical direction V in FIG. 1. In this way, when the component 200 is secured in place by the platform system 130, the heating element 112 traverses relative to the component 200. The heating element 112 can be traversed relative to the component 200 at any suitable speed, which depends on the heat output of the heating element 112 and the capabilities of the imaging system 150 to capture the thermal response of the component 200. As one example, the traversing speed of the heating element 112 relative to the component 200 can be set such that the heating element 112 traverses the entire vertical length of the component 200 in thirty seconds (30 s). As another example, the heating element 112 traverses or moves relative to the component 200 for detection of defects between 2-5 cm/s.

At (306), the method (300) includes heating the component with the heating coil as the heating coil traverses relative to the component. For instance, the one or more processors of the computing system 160 can cause the power source 120 to deliver an electrical current to the heating element 112 as the heating element 112 traverses relative to the component 200 along the traversing direction T1. When the heating element 112 is excited by the electric current provided by the power source 120, heat radiates from the heating element 112. The heat radiating from the heating element 112 inductively heats the component 200. The component 200 exhibits a transient thermal response as a result of being heated by the heating element 112. Particularly, as shown in FIG. 2, heat radiates outward toward the outer surface 216 of the barrier coat 214 and to the exterior environment. Transient thermal gradients are created due to the difference in the heat radiating outward from non-defect regions 232 of the barrier coat 214 and the heat radiating outward from defects 230 in the barrier coat 214. The imaging camera 152 can capture these transient thermal gradients or responses and detect defects in the barrier coat 214 based on such transient thermal responses.

At (308), optionally, the method (300) includes pulsing an airflow through an interior passage defined by the component as the heating element traverses relative to the component and applies heat thereto. For instance, as shown in FIGS. 1 and 2, in some implementations the system 100 includes airflow generator 140. Component 200 can be positioned on platform system 130 such that airflow generator 140 is in fluid communication with the interior passages 218 of the component 200, e.g., by one or more conduits fluidly connected the airflow generator 140 and one or more interior passages 218 of the component 200. In such implementations, the one or more processors of the computing system 160 are configured to cause, as the heating element 112 traverses relative to the component 200 and applies heat thereto, the airflow generator 140 to pulse an airflow through one or more interior passages 218 of the component 200. The pulsed airflow can flow out of one or more holes 220 in fluid communication with the one or more interior passages 218. In this manner, improved detectability of defects (e.g., pits and spits) can be achieved, especially around functionally important features. As noted previously, the airflow generator 140 can be controlled to pulse volumes of air at a predetermined frequency or interval and to provide a predetermined volume of air with each pulse. The predetermined frequency can range from $10^{-2}$ to $10^2$ Hz, for example.

At (310), the method (300) includes capturing, with an imaging device, a plurality of images of the component as the heating element traverses relative to the component and applies heat thereto, wherein the plurality of captured images can indicate a thermal response of the component to the applied heat. Accordingly, (304), (306), and (310) can take place simultaneously. In some implementations, the plurality of images can be captured as the heating element traverses relative to the component and applies heat thereto while the airflow generator is pulsing volumes of air into the interior passages of the component. Accordingly, in some implementations, (304), (306), (308), and (310) can take place simultaneously. The imaging camera 152 of the imaging system 150 can be used to capture the plurality of images of the component 200 as the heating element 112 traverses relative to the component 200 and applies heat thereto. The imaging camera 152 can remain in a fixed position as it captures the plurality of images.

In some implementations, the imaging camera 152 of the imaging system 150 can be a mid-wavelength IR camera operable to capture wavelengths in a range of about three to six micrometers (or microns) (3-6 μm). A mid-wavelength IR camera is particularly suited to capture defects in the metallic structure 210 (FIG. 2) and/or the metallic bond coat 212 (FIG. 2) of the component 200. In other implementations, the imaging camera 152 can be a long wavelength IR camera operable to capture wavelengths in a range of about six to fourteen micrometers (or microns) (6-14 μm). The long wavelength IR camera is particularly suited to capture defects in the metallic bond coat 212 (FIG. 2) and the barrier coat 214 (FIG. 2) of the component 200.

Figure 4:
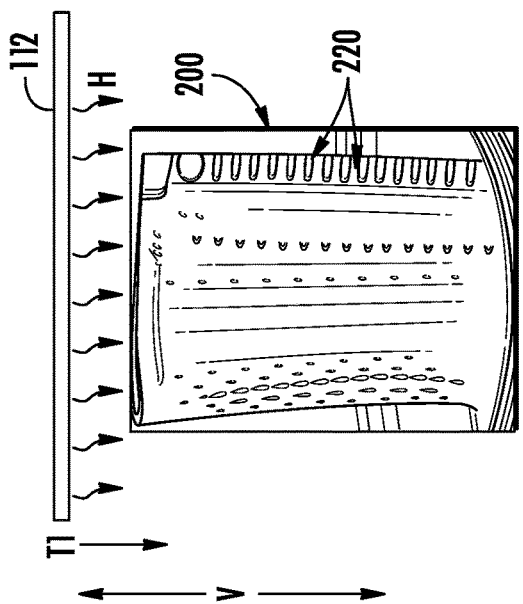

FIGS. 4-7 provide schematic views of the heating element 112 traversing relative to the component 200 as the heating element 112 applies heat thereto (i.e., to the component 200). In FIG. 4, the heating element 112 is positioned in a first position, which is a position vertically above the component 200 along the vertical direction V in this example. The first position is the starting position in this example embodiment. To capture images of the transient thermal signature or response of the component 200 with the imaging camera 152 (FIG. 1), the computing system 160 (FIG. 1) of system 100 causes the heating element 112 to traverse relative to the component 200 and apply heat thereto. More particularly, the one or more processors of the computing system 160 (FIG. 1) cause the heating element 112 to heat the component 200. Heat H is shown radiating from the heating element 112. The heat H radiating from the heating element 112 imparts thermal energy or heat H to the component 200. With heat H radiating from the heating element 112, the one or more processors of the computing system 160 (FIG. 1) cause the heating element 112 to traverse relative to the component 200 along the traversing direction T1, which is downward along the vertical direction V in this example.

Figure 5:
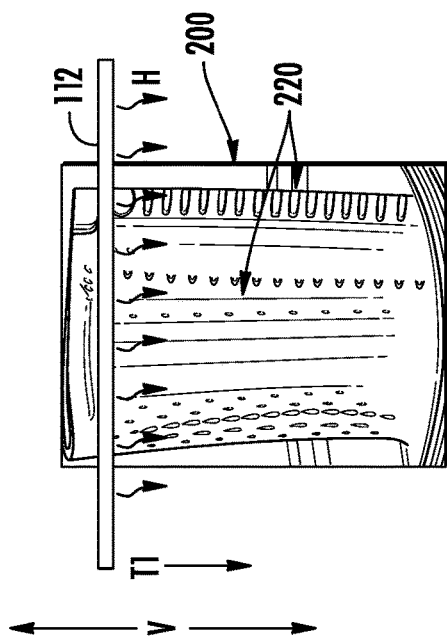
FIGS. 4-7 provide schematic views of a heating element of the system of FIG. 1 traversing relative to the component of FIG. 1 as the heating element applies heat to the component.
Figure 7:
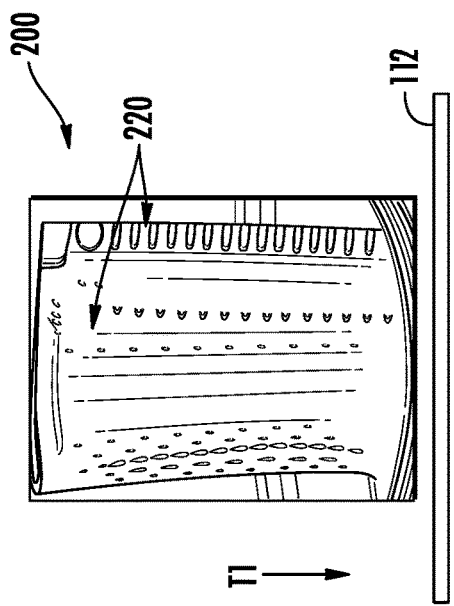
Figure 6:
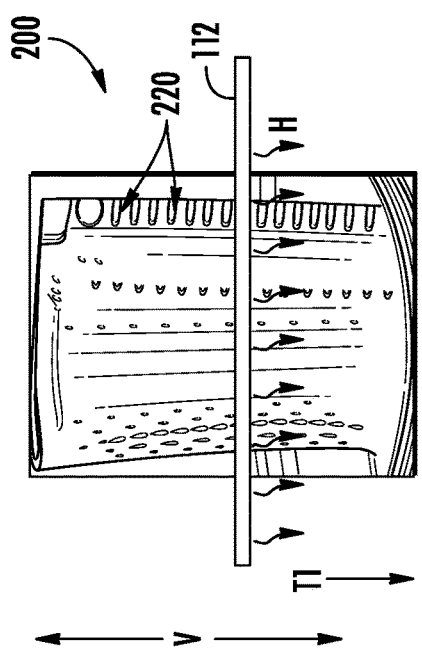

FIGS. 5, 6, and 7 depict the heating element 112 at various positions along its traversing path. In FIG. 5, the heating element 112 is positioned in a second position, a position below the first position along the vertical direction V. In FIG. 6, the heating element 112 is shown in a third position, a position below the second position along the vertical direction V. In FIG. 7, the heating element 112 is shown in a fourth position, a position below the third position along the vertical direction V. In the fourth position, the heating element 112 has finished traversing relative to the component 200 along the traversing direction T1. The fourth position is the starting position in this example embodiment. The heating element 112 can be moved or traverse relative to the component 200 at a constant or substantially constant speed along the traversing direction T1. The imaging camera 152 (FIG. 1) can capture a plurality of images of the component 200 as the heating element 112 moves along the traversing direction T1, e.g., from the first position (FIG. 4) to the fourth position (FIG. 7). Images of the component 200 can be captured at any suitable capture rate (e.g., any suitable number of frames per second).

As the heating element 112 traverses relative to the component 200 (e.g., from the position shown in FIG. 4 to the position shown in FIG. 7) and applies heat H thereto, the imaging camera 152 (FIG. 1) captures the transient thermal response of the component 200. More specifically, due to the movement of the heating element 112 relative to the component 200 and the heat H applied to the component 200, transient thermal gradients are created between the non-defect regions 232 (FIG. 2) and defects 230 (FIG. 2) of the component 200. The transient thermal gradients can be enhanced (i.e., made steeper and thus more apparent to the imaging camera 152 (FIG. 1)) by pulsing airflow through the interior passages 218 of the component 200 using the airflow generator 140.

Figure 8:
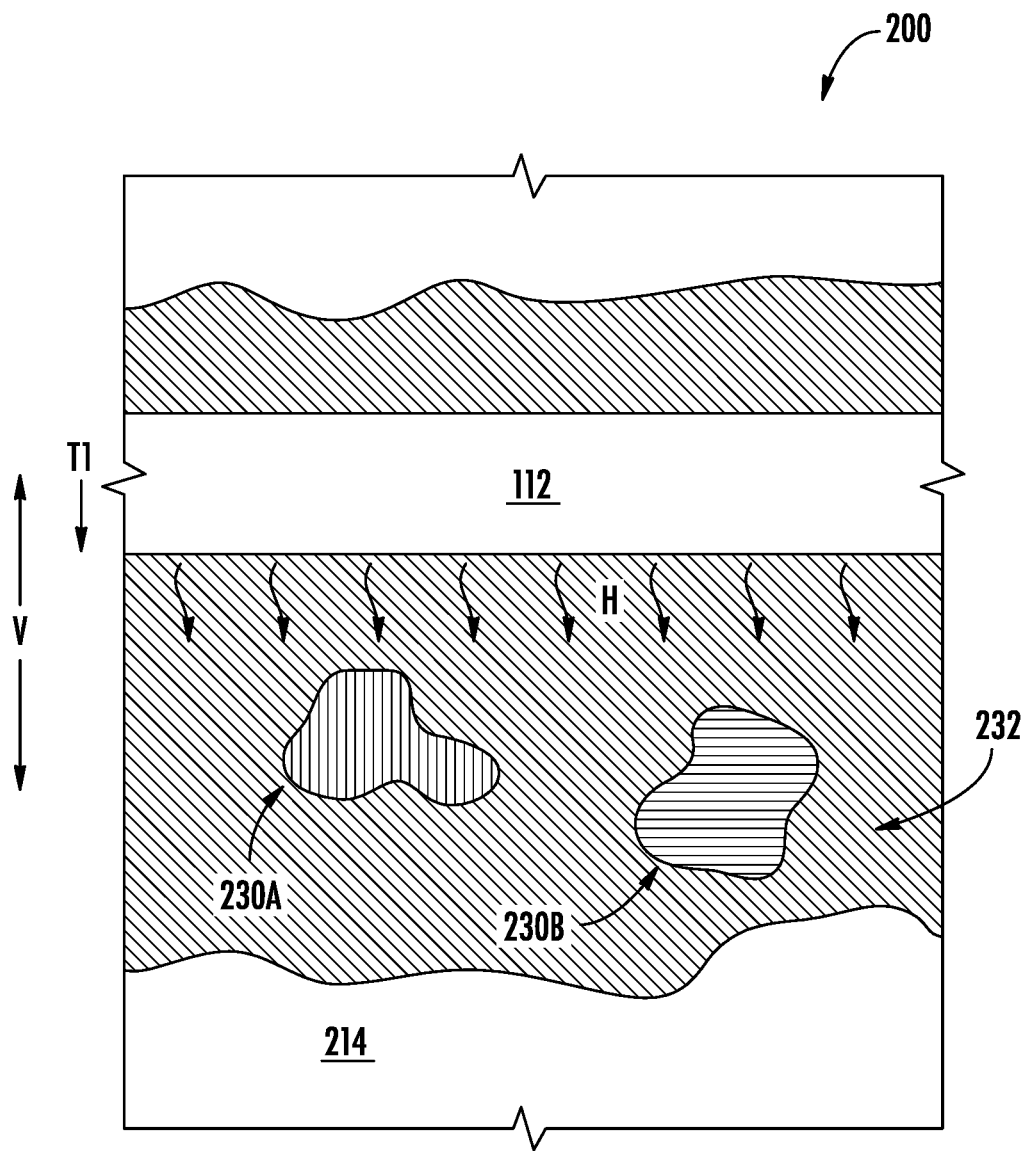
FIG. 8 provides a close-up view of the heating element of FIGS. 4-7 traversing and heating the component.

Particularly, as shown best in FIG. 8 that depicts a close-up view of the heating element 112 traversing and heating the component 200, transient thermal gradients are created adjacent to and forward of the heating element 112 along the traversing direction T1, which in this example is below the heating element 112 along the vertical direction V. Notably, when heat H is applied to the component 200, the non-defect region(s) 232 and the defect regions 230 of the component 200 produce different thermal signatures. That is, the non-defect region(s) 232 and the defect regions 230 produce different thermal emission rates. Further, each type of defect can have an identifiable thermal signature or emission rate. For instance, the non-defect region(s) 232 of the component 200 can produce a first thermal emission rate or first thermal signature as represented by the crosshatch pattern in FIG. 8. A pit 230A or void defect can produce a second thermal emission rate or second thermal signature as represented by the vertical line pattern in FIG. 8. Further, a spit 230B can produce a third thermal emission rate or third thermal signature as represented by the horizontal line pattern in FIG. 8. Other types of defects can also have associated thermal emission rates or thermal emission rates. The imaging camera 152 can capture these differing transient thermal responses and the computing system 160 can analyze the coating(s) of the component 200 based on these differing thermal responses captured in the images.

At (312), in some implementations, the method (300) includes generating a single image from the plurality of captured images, wherein the single image indicates the one or more detected coating defects in the barrier coating of the component. For instance, the one or more processors of the computing system 160 can generate a single image from the plurality of captured images captured by the imaging camera 152, the single image indicating the one or more detected coating defects in the barrier coating of the component. In some implementations, as shown in FIG. 12, one or more memory devices 166 of the computing system 160 can store instructions 166A. The instructions 166A can include a single image generator component 165. When the single image generator component 165 is executed by the one or more processors 164, the captured images are used to generate a single image that indicates defects in the barrier coating of the component or defects in the component generally.

Figure 9:
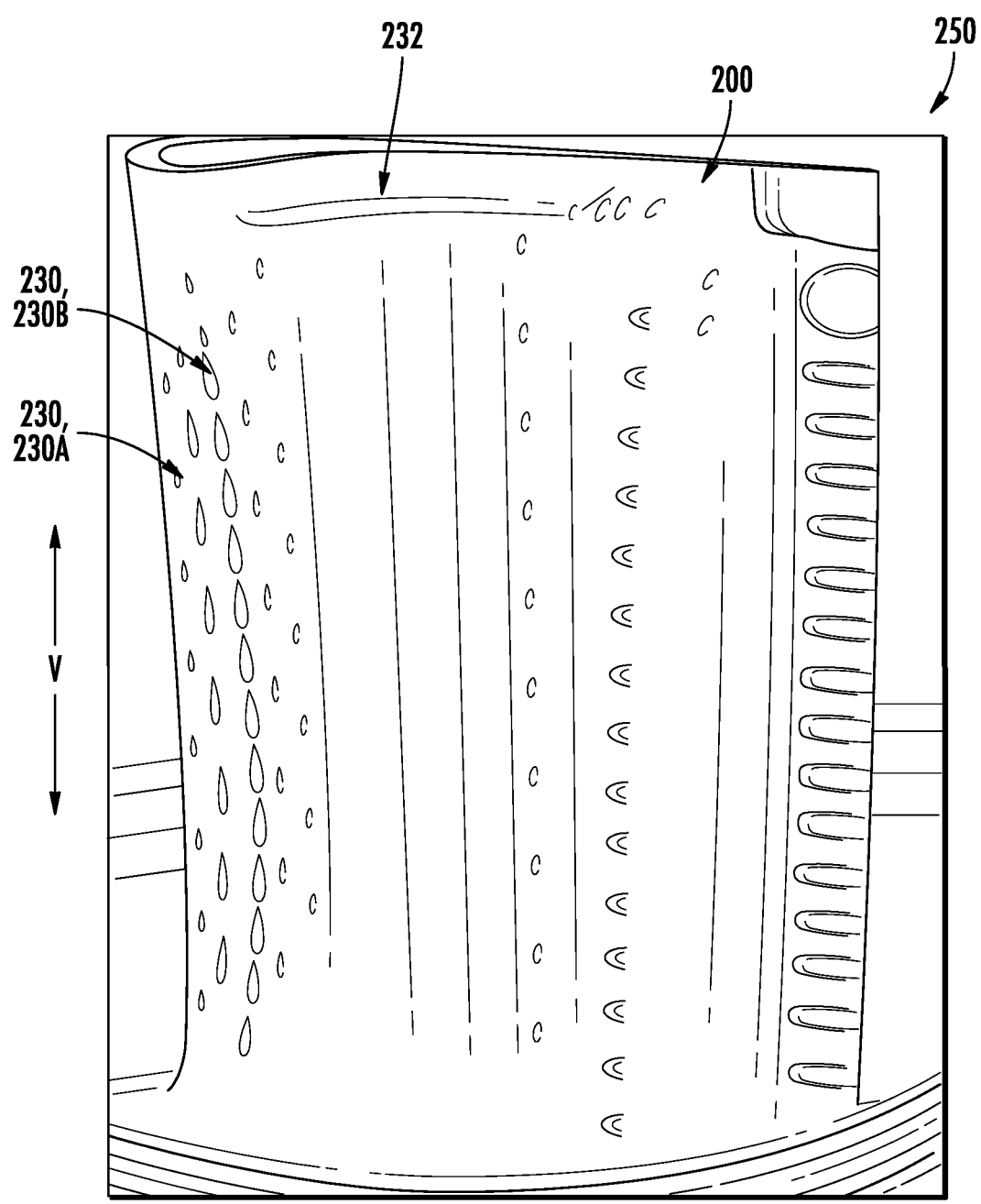
FIG. 9 provides a schematic view of a single image of the component generated from a plurality of captured images.

FIG. 9 provides a schematic view of a single image 250 generated from the plurality of captured images. The single image 250 of FIG. 9 can be generated as a result of the one or more processors 164 (FIG. 12) executing the single image generator component 165 (FIG. 12) of the instructions 166A (FIG. 12). As illustrated in FIG. 9, the single image 250 indicates the detected coating defects 230 in the barrier coating 214 of the component 200. Particularly, the single image 250 indicates that the component 200 has one or more pits 230A and one or more spits 230B. The component and its thermal response to being heated by the heating element 112 as it traversed relative thereto is embodied in the single image 250 by a plurality of pixels. As will be explained in greater detail herein, each pixel in the single image 250 that represents a portion of the component 200 can indicate a maximum temperature captured by the imaging camera 152 for that particular pixel. That is, each pixel of the single image 250 represents the maximum sensed temperature for that pixel considering all temperature data received for all the captured images.

Notably, the single image 250 is generated from captured images that all depict the component 200 at the same orientation or position relative to the imaging camera 152. That is, the single image 250 is generated from images that all capture the same perspective of the component 200. For example, where the component is a high pressure turbine blade of a gas turbine engine, a first single image can be generated for a first side of the blade (e.g., a pressure side of the blade) based on a plurality of images that capture the first side and a second single image can be generated for a second side of the blade (e.g., a suction side of the blade) based on a plurality of images that capture the second side. It will be appreciated that other single images can be generated for other sides or perspectives of the component 200 as well.

Example ways in which a single image can be generated by the one or more processors of the computing system 160 using a plurality of captured images will be described in detail herein with reference to FIGS. 13-22 and the accompanying text.

At (314), the method (300) includes detecting one or more coating defects in the barrier coating of the component based at least in part on the thermal response of the component captured in the plurality of images. For instance, in some implementations, the one or more processors of the computing system 160 (FIG. 1) detect the one or more coating defects in the barrier coating of the component using the single image generated at (312), which is generated using the plurality of captured images. In some implementations, the computing system 160 includes a computer vision system. Accordingly, as shown in FIG. 12, the instructions 166A stored on the one or more memory devices 166 can include a vision system component 167. The vision system component 167 can include signal processing features along with machine-learning algorithms. The machine-learning algorithms can be embodied in a convolutional neural network, for example. Generally, when the vision system component 167 is executed by the one or more processors 164, one or more defects are detected in the barrier coating of the component or the component generally and the detected defects can be analyzed so that various characteristics of the detected defects can be determined. The vision system component 167 can include a defect detector component 167A. When the defect detector component 167A is executed by the one or more processors 164, one or more defects are detected in the barrier coating of the component or the component generally.

In some implementations, in detecting the one or more coating defects in the barrier coating of the component based at least in part on the thermal response of the component captured in the images at (314), the one or more processors of the computing system 160 are configured to identify one or more regions of the barrier coating having a transient thermal response outside of a predetermined range. In such implementations, the one or more regions of the barrier coating having the transient thermal response outside of the predetermined range are identified as the one or more coating defects of the barrier coating.

Figure 10:
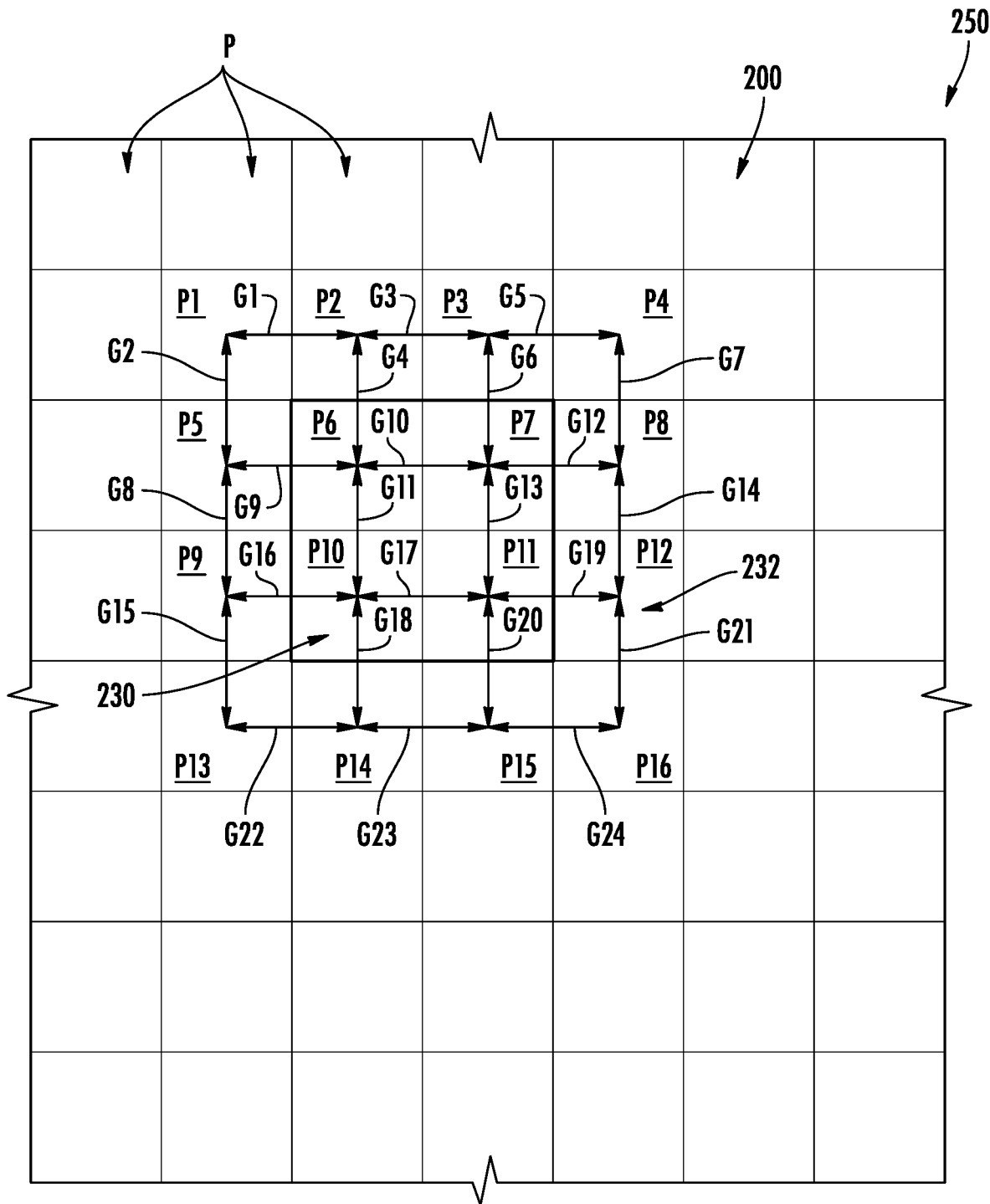
FIG. 10 provides a close-up view of a portion of the single image of FIG. 9 detailing one method of detecting a defect.

In some example implementations, the transient thermal response of the component can be defined in terms of a transient thermal gradient, e.g., a ratio of the temperature difference and the distance between two points, or equivalently, a change in temperature over a given length. By way of example, FIG. 10 provides a close-up view of the single image 250. The single image 250 includes a plurality of pixels P. A small sample size of the pixels are specifically labeled, including a first, second, third, fourth, fifth, sixth, seventh, eighth, ninth, tenth, eleventh, twelfth, thirteenth, fourteenth, fifteenth, and sixteenth pixel, respectively labeled as P1, P2, P3, P4, P5, P6, P7, P8, P9, P10, P11, P12, P13, P14, P15, and P16. In this example, the pixels P are squares but in other implementations the pixels P can be other suitable shapes. In this example, to identify one or more regions of the barrier coating having a transient thermal response outside of a predetermined range, the one or more processors of the computing system 160 are configured to determine a plurality of transient thermal gradients.

As shown in FIG. 10, the predetermined length or distance between two points can be the distance between the center of one pixel and the center of an adjacent pixel. Other predetermined lengths associated with determining the thermal gradients are possible. For instance, the predetermined length or distance between two points can be the distance between the center of one pixel and the center of a pixel spaced five pixels away. It will be appreciated that these are example predetermined lengths. In this example implementation, for each pixel P, a transient thermal gradient is determined for each adjacent pixel. For instance, a first transient thermal gradient G1 is determined between the first pixel P1 and the second pixel P2 and a second transient thermal gradient G2 is determined between the first pixel P1 and the fifth pixel P5. It will be appreciated that transient thermal gradients can be determined for the pixel above and to the left of the first pixel P1 in FIG. 10. A small sample size of the determined thermal gradients are specifically labeled, including a first, second, third, fourth, fifth, sixth, seventh, eighth, ninth, tenth, eleventh, twelfth, thirteenth, fourteenth, fifteenth, sixteenth, seventeenth, eighteenth, nineteenth, twentieth, twenty first, twenty second, twenty third, and twenty fourth transient thermal gradients, respectively labeled as G1, G2, G3, G4, G5, G6, G7, G8, G9, G10, G11, G12, G13, G14, G15, G16, G17, G18, G19, G20, G21, G22, G23, and G24.

With the thermal gradients determined, the one or more processors of the computing system 160 are configured determine whether one or more of the determined transient thermal gradients are outside of a predetermined range, e.g., outside of a range of values associated with transient thermal gradients expected to be associated with non-defect regions of the component. Each transient thermal gradient can be compared to the predetermined range. For instance, in FIG. 10, it is determined whether each transient thermal gradient G1, G2, G3, G4, G5, G6, G7, G8, G9, G10, G11, G12, G13, G14, G15, G16, G17, G18, G19, G20, G21, G22, G23, and G24 (and so on for thermal gradients not shown) falls within the predetermined range. In this example, the one or more processors of the computing system 160 determine that G4, G6, G9, G12, G16, G18, G19, and G20 are outside of the predetermined range and that the remaining transient thermal gradients are not outside of the predetermined range. Accordingly, the one or more processors of the computing system 160 can determine or identify pixels P6, P7, P10, and P11 as a region of the barrier coating of the component as a defect in the barrier coating of the component. Other regions can be identified as defects in the same manner described above.

In some implementations, the predetermined range is one of a plurality of predetermined ranges. Each predetermined range can be associated with a region or location of the component. For instance, one predetermined range can be associated with a leading edge of the component, one predetermined range can be associated with an area surrounding a cooling hole, one predetermined range can be associated with a trailing edge of the component, etc. In such implementations, the determined thermal gradients can be compared to the predetermined range of the plurality of predetermined ranges associated with the region or location that corresponds with the location of the pixel being considered.

Figure 11:
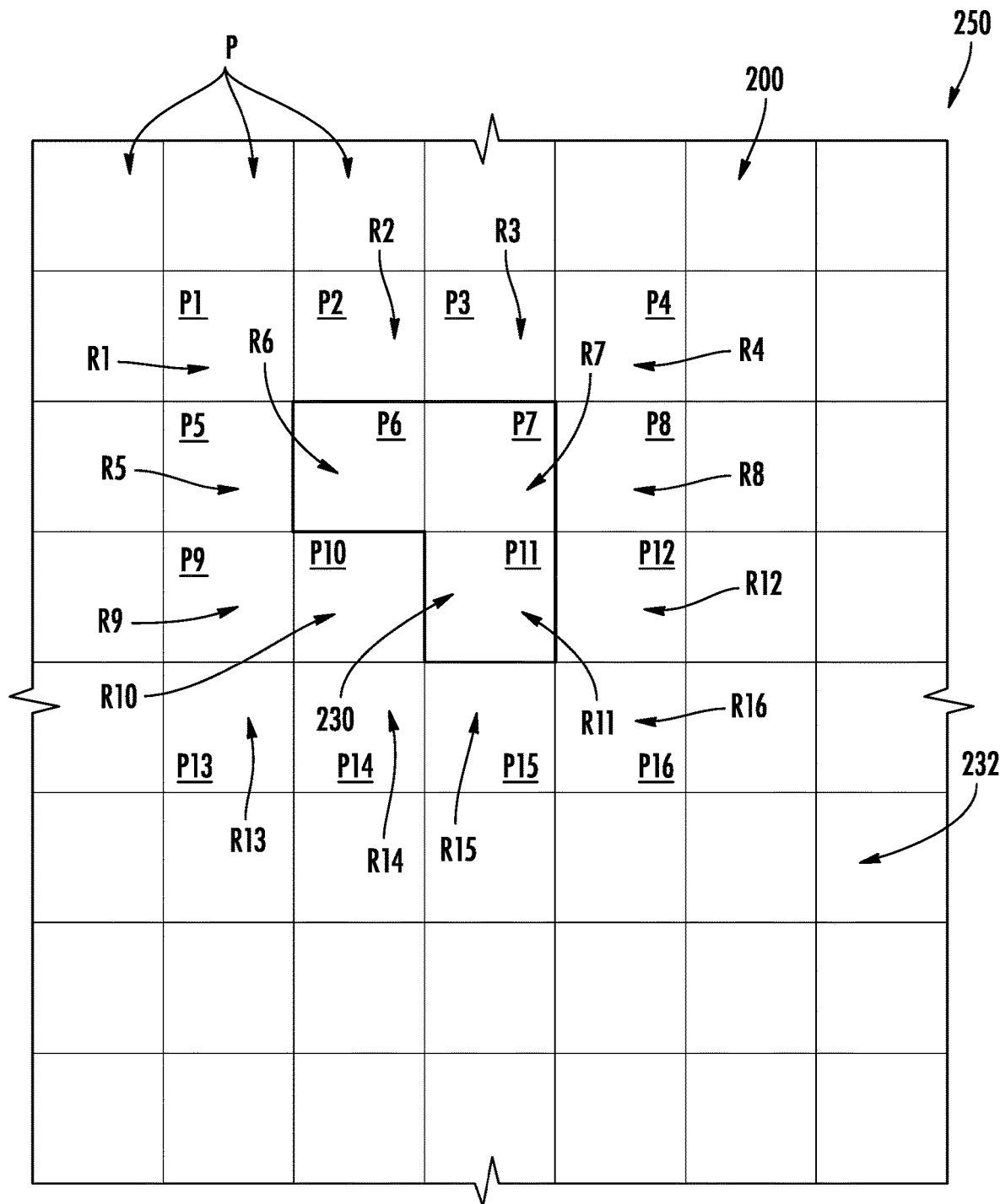
FIG. 11 provides a close-up view of the single image of FIG. 9 detailing another method of detecting a defect.

In some other example implementations, the transient thermal response of the component can be defined in terms of a transient thermal emission rate. By way of example, FIG. 11 provides another close-up view of a portion of the single image 250. Like the single image 250 of FIG. 10, the single image 250 of FIG. 11 includes a plurality of pixels P, including a first, second, third, fourth, fifth, sixth, seventh, eighth, ninth, tenth, eleventh, twelfth, thirteenth, fourteenth, fifteenth, and sixteenth pixel, respectively labeled as P1, P2, P3, P4, P5, P6, P7, P8, P9, P10, P11, P12, P13, P14, P15, and P16. In this example, the pixels P are squares but in other implementations the pixels P can be other suitable shapes. In this example, to identify one or more regions of the barrier coating having a transient thermal response outside of a predetermined range, the one or more processors of the computing system 160 are configured to determine the thermal emission rate of the component embodied each pixel P. As noted above, each pixel P can indicate a maximum temperature captured for that particular pixel considering all the temperatures captured in the plurality of images for the particular pixel.

As shown in FIG. 11, a transient thermal emission rate is determined for each pixel P. For instance, a first emission rate R1 is determined for the first pixel P1, a second emission rate R2 is determined for the second pixel P2, and so on for each pixel P. In this way, a first, second, third, fourth, fifth, sixth, seventh, eighth, ninth, tenth, eleventh, twelfth, thirteenth, fourteenth, fifteenth, and sixteenth thermal emission rates can be determined for their associated pixels as shown in FIG. 11. The thermal emission rates are respectively labeled as R1, R2, R3, R4, R5, R6, R7, R8, R9, R10, R11, R12, R13, R14, R15, and R16.

With the thermal emission rates determined, the one or more processors of the computing system 160 are configured determine whether one or more of the determined thermal emission rates are outside of a predetermined range, e.g., outside of a range of values associated with transient thermal emissions expected to be associated with non-defect regions of the component. Each transient thermal emission rate can be compared to the predetermined range. For instance, in FIG. 11, it is determined whether one or more of the transient thermal emission rates R1, R2, R3, R4, R5, R6, R7, R8, R9, R10, R11, R12, R13, R14, R15, and R16 (and so on for thermal emission rates not shown) falls within the predetermined range. In this example, the one or more processors of the computing system 160 determine that the thermal emission rates R6, R7, and R11 are outside of the predetermined range and that the remaining transient thermal emission rates are not outside of the predetermined range. Accordingly, the one or more processors of the computing system 160 can determine or identify pixels P6, P7, and P11 as a region of the barrier coating of the component as a defect in the barrier coating of the component. Other regions can be identified as defects in the same manner described above.

In some implementations, the predetermined range is one of a plurality of predetermined ranges. Each predetermined range can be associated with a region or location of the component. For instance, one predetermined range can be associated with a leading edge of the component, one predetermined range can be associated with an area surrounding a cooling hole, one predetermined range can be associated with a trailing edge of the component, etc. In such implementations, the determined thermal emission rates can be compared to the predetermined range of the plurality of predetermined ranges associated with the region or location that corresponds with the location of the pixel being considered.

In some implementations, in detecting the one or more coating defects in the barrier coating of the component based at least in part on the thermal response of the component captured in the images at (314), the one or more processors of the computing system 160 are configured to determine the rate of temperature change associated with a pixel or group of pixels of the captured images. Notably, defects can be detected during both heating and cooling of the component. Thus, the heating rate associated with the pixels can be determined and/or the cooling rate associated with the pixels can be determined. The determined heating rate of a pixel or a group of pixels can be compared to a predetermined heating rate. The predetermined heating rate can be a heating rate associated with an expected heating rate of a non-defect region of the component. Accordingly, if the determined heating rate of a pixel or group of pixels is outside of the predetermined heating rate, the pixel or group of pixels outside of the predetermined heating rate can be determined or identified as defect in the barrier coating (or a portion of a defect in the barrier coating). Furthermore, for the pixel or group of pixels having a heating rate determined to be outside of the predetermined heating rate, the determined heating rate of the pixel or group of pixels can be used to classify the defect associated therewith. For instance, various defects (e.g. spits, pits, delaminations etc.) can have corresponding expected heating rate ranges. The one or more processors can determine which of the heating rate ranges in which the determined heating range falls and the type of defect can be classified accordingly.

Additionally or alternatively, a determined cooling rate of a pixel or a group of pixels can be compared to a predetermined cooling rate. The predetermined cooling rate can be a cooling rate associated with an expected cooling rate of a non-defect region of the component. Accordingly, if the determined cooling rate of a pixel or group of pixels is outside of the predetermined cooling rate, the pixel or group of pixels outside of the predetermined cooling rate can be determined or identified as a defect in the barrier coating (or a portion of a defect in the barrier coating). Furthermore, for the pixel or group of pixels having a cooling rate determined to be outside of the predetermined cooling rate, the determined cooling rate of the pixel or group of pixels can be used to classify the defect associated therewith. For instance, various defects (e.g. spits, pits, delaminations etc.) can have corresponding expected cooling rate ranges. The one or more processors can determine which of the cooling rate ranges in which the determined cooling range falls and the type of defect can be classified accordingly.

FIG. 12 provides a graph depicting a time-temperature curve for a pixel according to one embodiment of the present disclosure. As shown, when heat is applied to the component via the traversing heating element, the portion of the component associated with the pixel begins to rise at t=0 seconds. At approximately t=5 seconds, the pixel reaches peak amplitude or peak temperature. After reaching peak amplitude, the location of the component corresponding to the pixel begins to cool as the heating element traverses away from the location of the component associated with the pixel. The one or more processors can generate a time-temperature graph for each pixel or group of pixels of the captured images.

As noted above, the one or more processors can determine the heating rate associated with the pixel. The heating rate can be determined based on the instantaneous temperature of the pixel captured in the plurality of images and the frame rate of the imaging device. The heating rate of the pixel is dependent on the material properties of the component and whether a defect is present at the location of the component associated with the pixel. In some implementations, the heating rate can be determined as an average heating rate over a predetermined time period. As one example, the predetermined time period can be a time period spanning from a time when the pixel exceeds a temperature threshold relative to its ambient temperature to a time when the pixel reaches peak amplitude, e.g., from time t=0 seconds to time t=5 seconds in FIG. 12. As another example, the predetermined time period can be a predefined time period in which the portion of the component associated with the pixel is increasing in temperature. The heating rate can be determined and compared to a predetermined heating rate range as described above. When the pixel has a determined heating rate inside of the predetermined heating rate range, the location of the component associated with the pixel is identified as a non-defect portion or region of the component. When the pixel has a determined heating rate outside of the predetermined heating rate range, the location of the component associated with the pixel is identified as a defect or defect region of the component. Further, when the pixel has a determined heating rate outside of the predetermined heating rate range, the type of defect can be classified based on the determined heating rate, e.g., in the manner noted above.

Additionally or alternatively, the one or more processors can determine the cooling rate of the portion of the component associated with the pixel. The cooling rate can be determined based on the instantaneous temperature of the pixel captured in the plurality of images and the frame rate of the imaging device. The cooling rate of the pixel is dependent on the material properties of the component and whether a defect is present at the location of the component associated with the pixel. In some implementations, the cooling rate can be determined as an average cooling rate over a predetermined time period. As one example, the predetermined time period can be a time period spanning from a time when the pixel reaches peak amplitude to a time when the pixel reaches a temperature outside of a predefined margin of the peak amplitude, e.g., from time t=5 seconds to time t=16 seconds in FIG. 12. As another example, the predetermined time period can be some other predefined time period. The cooling rate can be determined and compared to a predetermined cooling rate range as described above. When the pixel has a determined cooling rate inside of the predetermined cooling rate range, the location of the component associated with the pixel is identified as a non-defect portion or region of the component. When the pixel has a determined cooling rate outside of the predetermined cooling rate range, the location of the component associated with the pixel is identified as a defect or defect region of the component. Further, when the pixel has a determined cooling rate outside of the predetermined cooling rate range, the type of defect can be classified based on the determined cooling rate, e.g., in the manner noted above.

Notably, the peak amplitude associated with a pixel can correspond to or is a measure of the size of the defect. The greater the amplitude of the pixel, the larger the defect, and conversely, the smaller the amplitude of the pixel, the smaller the defect. Thus, in some implementations the size of a defect can be determined based at least in part on the amplitude of the pixel on its determined time-temperature curve. Further, in some implementations, if the peak amplitude associated with a pixel is below an amplitude threshold (i.e., below a temperature threshold), the heating and/or cooling rate of the pixel is not determined as the pixel is not or very likely not associated with a defect. This may conserve valuable computing resources of the one or more processors.

At (316), the method (300) includes analyzing the detected coating defects in the component. For instance, the one or more processors of the computing system 160 can utilize the single image generated at (312) to analyze the detected defects in the component. In some implementations, as shown in FIG. 12, the vision system component 167 includes a defect analyzer component 167B. When the defect analyzer component 167B is executed by the one or more processors 164, the defects detected at (314) can be analyzed so that various characteristics of the detected defects can be determined. In some implementations, the defect detector component 167A and the defect analyzer component 167B can be combined into a single component or set of instructions.

In some implementations, in analyzing the detected defects in the component at (316), the one or more processors of the computing system 160 are configured to determine one or more characteristics associated with the detected defects or defect regions identified at (314). For instance, the one or more processors of the computing system 160 can be configured to determine a quantity of the identified one or more coating defects in the barrier coating. That is, the total number of identified defects in the coating or component can be determined. The quantity of identified defects can be representative of the total number of defects identified in the single image. As the single image may only capture one side or perspective of the component, it will be appreciated that the quantity of defects in other single images generated for other perspectives or sides of the component would need to be added together to determine the total quantity of defects in the barrier coat of the component. For example, where the component is a high pressure turbine blade of a gas turbine engine, the number of defects identified in a first single image generated for a first side of the blade (e.g., a pressure side of the blade) would need to be added to the number of defects identified in a second single image generated for a second side of the blade (e.g., a suction side of the blade) to determine the total number of defects for the component.

The one or more processors of the computing system 160 can be configured to determine other characteristics associated with the detected defects as well. For instance, the one or more processors of the computing system 160 can be configured to determine a depth or elevation of the identified coating defects. With reference again to FIG. 2, determining a depth D1 of a defect, such as the pit 230A, can be informative as to the severity of the defect. Particularly, determining the depth D1 of a defect can be informative as to whether the metallic structure 210 or the bond coat 212 of the component 200 is exposed to the exterior environment as a result of the defect or whether the defect is contained to the barrier coat 214. Also, defect depth can be informative as to errors or problems with the coating machine or process. In some implementations, the depth D1 can be defined as a distance from the outer surface 216 of the barrier coat 214 to the deepest portion of the defect as shown in FIG. 2. In other implementations, the depth D1 can be defined as a distance from the outer surface 216 of the barrier coat 214 to the average depth of the defect.

Determining the elevation E1 of a defect, such as spit 230B, can be useful as well. For instance, the elevation E1 of a defect can be informative as to errors or problems with the coating machine or process and can provide insight as to the probability the spit will break off and as to the size of the void that would result if the spit breaks away from the component, e.g., during engine operation. In some implementations, the elevation E1 can be defined as a distance from the outer surface 216 of the barrier coat 214 to the apex of the defect as shown in FIG. 2. In other implementations, the elevation E1 can be defined as a distance from the outer surface 216 of the barrier coat 214 to the average elevation of the defect.

The depth and/or elevation of defects can be determined by the one or more processors of the computing system 160 based on the thermal response of the component captured in the single image. For instance, a defect having a greater depth may exhibit a higher thermal emission rate than a defect having a shallower depth. Thus, the emission rates represented in the pixels of the single image can be correlated with depths (e.g., by a lookup table). Moreover, a defect having a greater elevation may exhibit a lower thermal emission rate than a defect having a lower elevation. Thus, the emission rates represented in the pixels of the single image can be correlated with elevations (e.g., by a lookup table).

The one or more processors of the computing system 160 can also be configured to determine an area fraction or percentage of each of the identified coating defects of the barrier coating. That is, the fraction of area of a given defect or defect region relative to the total surface area of the component (or total surface area of the side of the component depicted in the single image) can be determined. As one example, the number of pixels associated with a defect can be compared to the total number of pixels in the single image that represent a portion of the component. The area fraction of the defects can be determined in other suitable ways as well. In addition, the one or more processors can be configured to determine the total area fraction of the portion of the component represented in the single image, e.g., by adding together all area fractions associated with identified defects and comparing the sum relative to the total surface area of the portion of the component represented in the single image. Further, in some implementations, the one or more processors can be configured to determine the total area fraction of the component, e.g., by adding together all area fractions associated with identified defects and comparing the sum relative to the total surface area of the component. To determine the total area fraction of the component associated with identified defects, it will be appreciated that area fractions determined for defects of other generated single images (e.g., a single image representing another side of the component) would be considered in the determining the total area fraction.

In some implementations, in analyzing the detected defects in the component at (316), the one or more processors of the computing system 160 are configured to classify the defects into categories or types of defects, e.g., as pits or spits. In some implementations, the one or more processors of the computing system 160 are configured to classify the identified defects based at least in part on the thermal response of the identified defects. For instance, as noted above, the non-defect region(s) and the defects of a component produce different thermal emission rates and the pixels of the component are representative of this fact. In addition, certain defects produce thermal emission rates in identifiable ranges. For instance, pits may produce thermal emission rates in a first predetermined range, spits may produce thermal emission rates in a second predetermined range, and so on for other types of defects. Accordingly, the thermal emission rate of each defect can be utilized to classify the type of defect identified. Each defect can be classified based on the average thermal emission rate represented by the pixels associated with a given defect and/or based on the pixel associated with the defect having the greatest or lowest thermal emission rate.

Furthermore, thermal gradients determined between adjacent pixels can also be utilized to classify the defect. For instance, pits may produce a gradient having a steepness or grade in a first predetermined range, spits may produce a gradient having a steepness or grade in a second predetermined range, and so on for other types of defects. In some implementations, each defect can be classified based on the average grade or steepness of all of the thermal gradients extending from a pixel representing a non-defect region and a pixel forming part of the perimeter of the identified defect (e.g., the average steepness of the thermal gradients G4, G6, G9, G12, G16, G18, G19, G20 in FIG. 10). In other implementations, each defect can be classified based on the steepest and/or lowest grade considering all the thermal gradients extending from a pixel representing a non-defect region and a pixel forming part of the perimeter of the identified defect.

In some other implementations, in analyzing the detected defects in the component at (316), the one or more processors of the computing system 160 are configured to classify the defects into categories or types of defects based at least in part on the one or more determined characteristics associated with the defects. For instance, the depth and/or elevation of a particular defect can be utilized to classify the defect. For example, defects having a depth within a predetermined depth range can be classified as a pit, defects having an elevation within a predetermined elevation range can be classified as a spit, and so on for other types of defects. In some implementations, in analyzing the detected defects in the component at (316), the one or more processors of the computing system 160 are configured to classify the defects into categories or types of defects based at least in part on the one or more determined characteristics associated with the defects and on the thermal response of the identified defects.

At (318), the method (300) includes determining whether the barrier coating of the component is an acceptable barrier coating. For instance, on the one hand, when the barrier coat of the component passes all or some combination of predefined criteria, then the barrier coat is determined as acceptable. On the other hand, when the barrier coat of the component does not pass all or some combination of predefined criteria, then the barrier coat is determined as unacceptable.

In some implementations, the one or more processors of the computing system 160 are configured to determine whether the barrier coating of the component is an acceptable barrier coating based on at least one of the following comparisons: the quantity of the identified one or more coating defects of the barrier coating with a quantity threshold; the depth of each of the identified one or more coating defects of the barrier coating with a depth threshold; the area fraction of the identified one or more coating defects of the barrier coating with an area fraction threshold. In some implementations, the barrier coating must pass all comparisons. In other implementations, the barrier coating must pass some combination thereof, such as two out of the three comparisons.

Additionally or alternatively to the comparisons noted above, in some implementations, the one or more processors of the computing system 160 are configured to determine whether the barrier coating of the component is an acceptable barrier coating based on the number of defects classified as a particular type of defect exceeding a quantity threshold, an area fraction threshold, etc. For example, if the number of pits exceeds a pit quantity threshold, the carrier coating would be determined as unacceptable. Other predefined criteria for determining whether the barrier coating is acceptable are possible. The one or more processors of the computing system 160 can determine whether the barrier coating is acceptable automatically without any need for human visual inspection of the component.

At (320), the method (300) includes displaying information associated with the inspection of the component. For instance, the one or more processors of the computing system 160 can cause the display device 172 to display information associated with the inspection of the component. Various types of information can be displayed. For example, the results of the inspection process can be displayed on display device 172, e.g., a graphic on the display device 172 can indicate whether the barrier coating of the component is acceptable or unacceptable. Further, the determined characteristics of the detected defects can be displayed on display device 172. For instance, without limitation, the quantity or total number of identified defects can be displayed, the total area fraction of the identified defects can be displayed, the depth of various defects can be displayed, and the elevation of various defects can be displayed. Other characteristics associated with the identified defects can be displayed as well.

Furthermore, the single image generated at (312) can be displayed on the display device 172. The displayed single image can indicate the thermal response or signature of the component 200 in response to the heating element 112 traversing relative to the component 200 and applying heat thereto. When the single image is displayed the characteristics associated with the defects identified in the single image can be displayed as well. In addition, other single images generated for other perspectives of the component can be displayed on the display device 172. The user interface 170 provide a means of scrolling between generated single images. When a particular single image is displayed on the display device 172, the characteristics associated with the defects identified in that particular single image can be displayed as well.

FIG. 12 provides a block diagram of the computing system 160. The computing system 160 can include one or more computing device(s) 162 that can be used to implement the methods and systems described herein according to example embodiments of the present disclosure. Computing device 162 is one example of a suitable computing device for implementing the computing elements described herein.

As noted previously, the computing device 162 can include one or more processor(s) 164 and one or more memory device(s) 166. The one or more processor(s) 164 can include any suitable processing device, such as a microprocessor, microcontroller, integrated circuit, logic device, or other suitable processing device. The one or more memory device(s) 166 can include one or more computer-readable media, including, but not limited to, non-transitory computer-readable media, RAM, ROM, hard drives, flash drives, and other memory devices, such as one or more buffer devices.

The one or more memory device(s) 166 can store information accessible by the one or more processor(s) 164, including computer-readable instructions 166A that can be executed by the one or more processor(s) 164. The instructions 166A can be any set of instructions that when executed by the one or more processor(s) 164, cause the one or more processor(s) 164 to perform operations, such as causing the heating element to traverse relative to the component while applying heat thereto, causing the airflow generator to pulse air into the interior passages of the component, causing a single image to be generated from a plurality of captured images, and/or causing the vision system to detect and analyze the identified defects, among other operations. The instructions 166A can be software written in any suitable programming language or can be implemented in hardware. In some embodiments, the instructions 166A can be executed by the one or more processor(s) 164 to cause the one or more processor(s) 164 to perform operations.

The memory device(s) 166 can further store data 166B that can be accessed by the processors 164. For example, the data 166B can include images captured by the imaging device, baseline data, model data, logic data, etc., as described herein. The data 166B can include one or more table(s), function(s), algorithm(s), model(s), equation(s), etc. according to example embodiments of the present disclosure.

The one or more computing device(s) 162 can also include a communication interface 168 used to communicate, for example, with the other components of system. The communication interface 168 can include any suitable components for interfacing with one or more network(s), including for example, transmitters, receivers, ports, controllers, antennas, or other suitable components.

Generation of a Single Observation Image

The way in which a single observation image can be generated by one or more processors using images captured by the imaging device will now be described in detail. Capturing the transient thermal responses into one single observation image allows for quicker and more accurate inspections of components. 3D data (the plurality of captured images or movie) is intelligently processed into a 2D image indicating the transient thermal responses of the component without depicting the traversing heating element.

Figure 14:
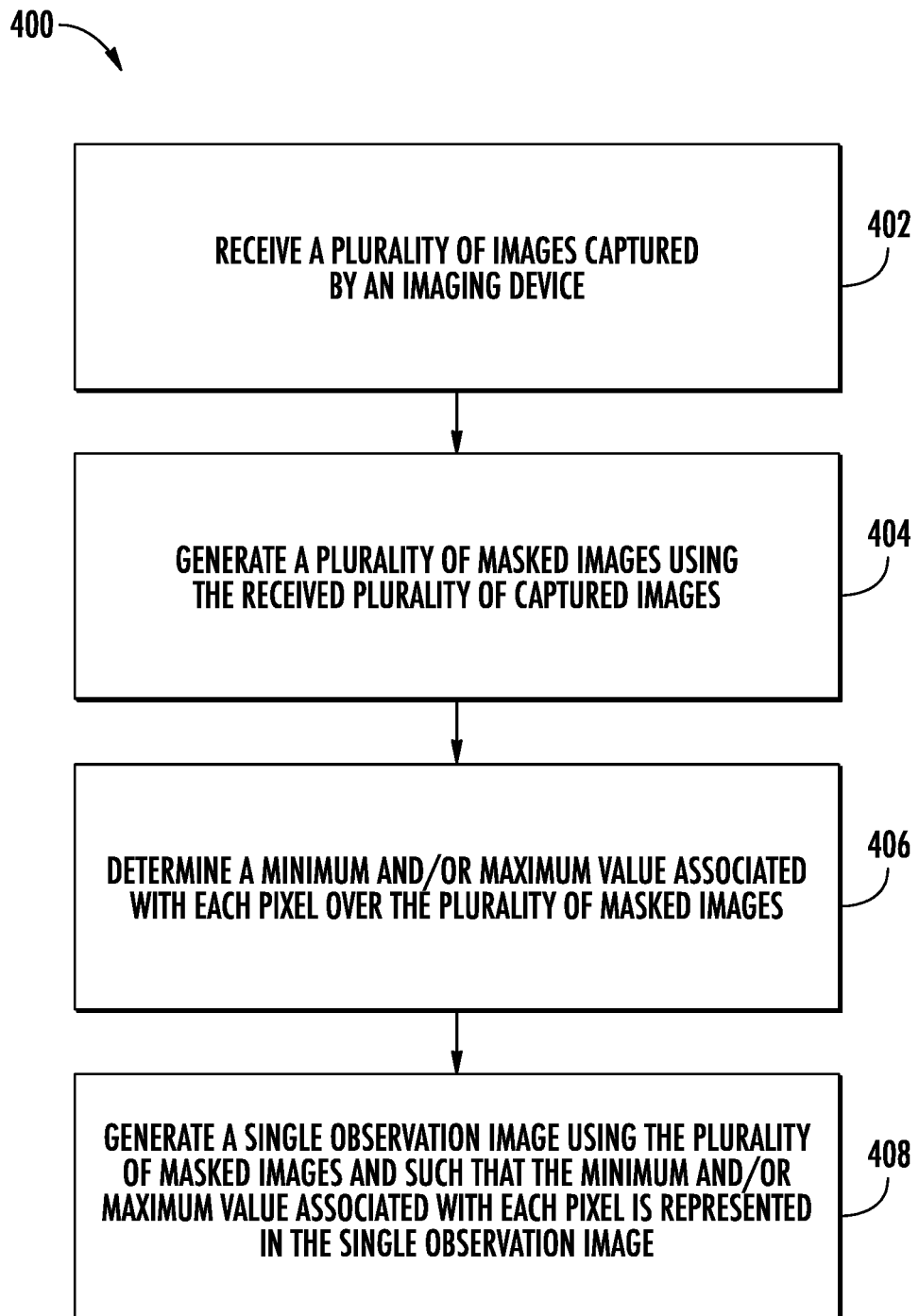
FIG. 14 provides a flow diagram for an example method of generating a single observation image according to one embodiment of the present disclosure.

FIG. 14 provides a flow diagram for an example method (400) of generating a single observation image. For instance, the method (400) can be used to generate the single image 250 of FIG. 9. With reference to FIG. 12, the one or more processors 164 of the computing system 160 can execute the single image generator component 165 of the instructions 166A to generate the single image 250. FIG. 14 depicts actions performed in a particular order for purposes of illustration and discussion. Those of ordinary skill in the art, using the disclosures provided herein, will understand that various actions of any of the methods disclosed herein can be modified in various ways without deviating from the scope of the present disclosure. Reference will be made to various features of the coating inspection system 100 and the component 200 described herein and illustrated in the figures.

At (402), the method (400) includes receiving, by one or more processors, a plurality of images captured by an imaging device. Each image of the plurality of images captures a component having a barrier coating as a heating element traverses relative to the component along a traversing direction and applies heat thereto. For instance, the one or more processors 164 of the computing system 160 can receive the plurality of images captured by the imaging camera 152. The component can be the component 200 depicted in FIG. 1 or some other component having a metallic structure and a barrier coating. The plurality of images or frames can collectively depict the thermal response of the component as the heating element traverses relative to the component along the traversing direction and applies heat thereto. That is, the imaging camera 152 of FIG. 1 can capture images of the thermal response of the component as the heating element 112 traverses along its traversing path and applies heat to the component 200, e.g., as shown in FIGS. 4-7. That, each image can capture an instantaneous temperature profile of the component 200 in response to the heating element 112 sweeping by and imparting heat to the component 200. Since cracks and other defects are surface discontinuities, they create barriers for the flow of Eddy currents, and consequently, hot-spots are formed as temporal and spatial events in the temperature profiles in the images captured by the imaging device. Accordingly, the individual images can each capture a localized transient thermal response of the component. Each image can have the same number of pixels.

At (404), the method (400) includes generating a plurality of masked images using the captured plurality of images. For instance, the one or more processors 164 of the computing system 160 can generate masked images using the captured images received at (402). In some implementations, the masked images are generated by positioning, for each image of the plurality of images, a masking window adjacent to and forward of the heating element along the traversing direction and applying thermal data to pixels within the masking window of each image of the plurality of images.

By way of example, FIGS. 15-18 depict a number of images 260 of the component 200 captured by the imaging device as the heating element 112 traversed relative to the component 200 along the traversing direction T1 and applied heat thereto. In this example, the traversing direction T1 is a direction along the vertical direction V. However, as noted, the traversing direction T1 can extend along a different direction in other implementations. Further, it will be appreciated that the imaging device can capture many more images than those shown in FIGS. 15-18, including images captured before, between, or after the captured images 260 depicted. The captured images 260 or frames may collectively capture the progression of the heating element 112 traversing the entire length of the component 200 (e.g., the vertical length).

As shown in each of the images 260 of FIGS. 15, 16, 17, and 18, the one or more processors of the computing system 160 position a masking window 270 adjacent to and forward of the heating element 112 along the traversing direction T1. Thus, as depicted, the masking window 270 moves frame by frame or image by image along with the heating element 112. The masking window 270 is depicted as a rectangle in FIGS. 15-18, but other shapes are possible.

One observation discovered in the course of experimentation with the system 100 (FIG. 1) is that the thermal transients or anomalies start to appear in front of the heating element 112 as it traverses relative to the component 200. Particularly, the thermal transients appear prominently relative to their background (i.e., non-defect regions) just forward of the heating element 112. Accordingly, in some implementations, the masking window 270 is placed adjacent to and forward of the heating element 112 in each captured image 260. In this example, consequently, the masking window 270 is placed adjacent to and forward of the heating element 112 (just below the heating element 112 along the vertical direction V) in each captured image 260 of FIGS. 15-18.

Figure 15:
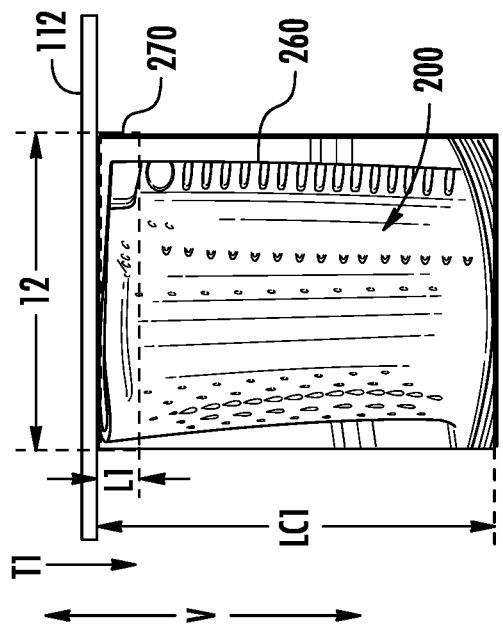
FIGS. 15-18 provide views of several images of a component captured by an imaging device as a heating element traversed relative to the component along a traversing direction and applied heat thereto.
Figure 16:
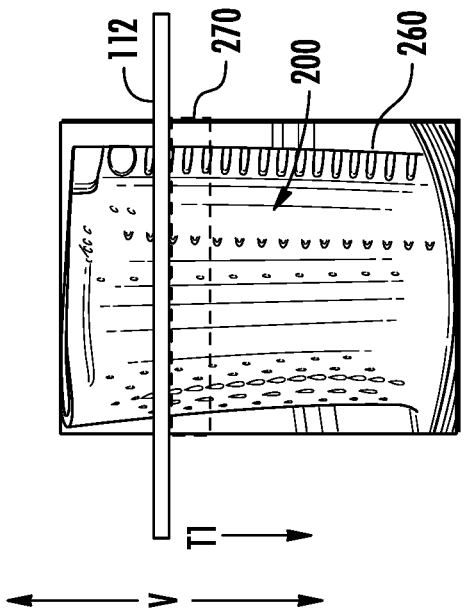
Figure 17:
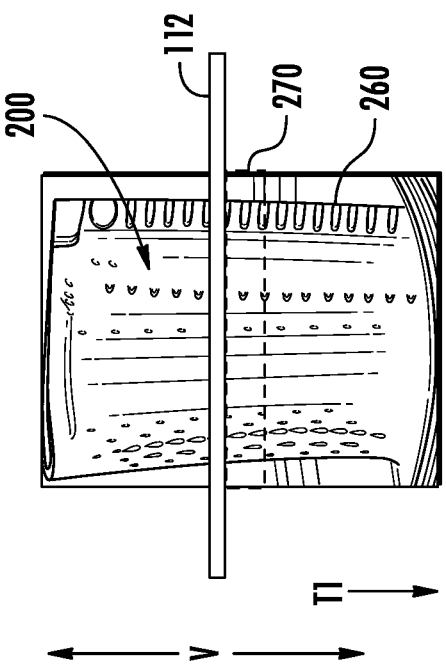
Figure 18:
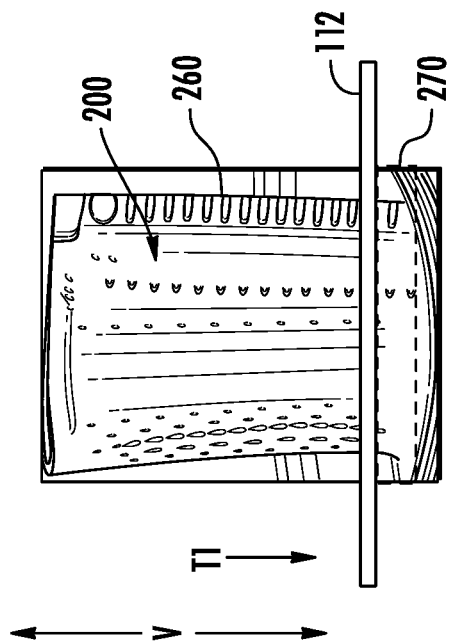

As shown best in FIG. 15, each masking window 270 has a first length L1 (e.g., a length extending along the traversing direction T1) and a second length L2 (e.g., a length extending perpendicular to the traversing direction T1). For this embodiment, the second length L2 of the masking window 270 spans the width of the captured image 260. Each masking window can have a second length L2 spanning a width of the image on which the masking window is positioned. In some embodiments, the second length L2 of the masking window 270 spans the width of the component 200. The first length L1 of the masking window 270 can be selected based on the selected heat output and traversing speed of the heating element 112. In some embodiments, the first length L1 of the masking window 270 is selected so that the masking window 270 captures the thermal response of the component 200 produced by heat radiating from the heating element 112 within its perimeter but is otherwise kept as short as possible to minimize computer processing times. In some embodiments, the first length L1 of the masking window 270 is less than one quarter of a component length LC1 of the component 200. The component length LC1 extends along the traversing direction T1. In some implementations, the first length L1 of the masking window 270 is less than one eighth of the component length LC1 of the component 200.

With masking windows 270 positioned adjacent to and forward of the heating element 112 in each captured image 260, the one or more processors 164 of the computing system 160 apply thermal data to pixels within the masking window 270 of each image 260. Notably, the masking window 270 acts to mask pixels outside of its perimeter. Thus, for each image 260, the pixels outside of the masking window 270 are ignored. In some implementations, the imaging device is an infrared imaging device and the thermal data is three dimensional (3D) infrared sensor data. The thermal data can indicate the instantaneous temperature profile of the component 200. In some implementations, applying thermal data to the pixels within the respective masking windows positioned in each image of the plurality of images includes assigning a value (e.g., a temperature value) to each of the pixels within the respective masking windows positioned in the images.

Figure 19:
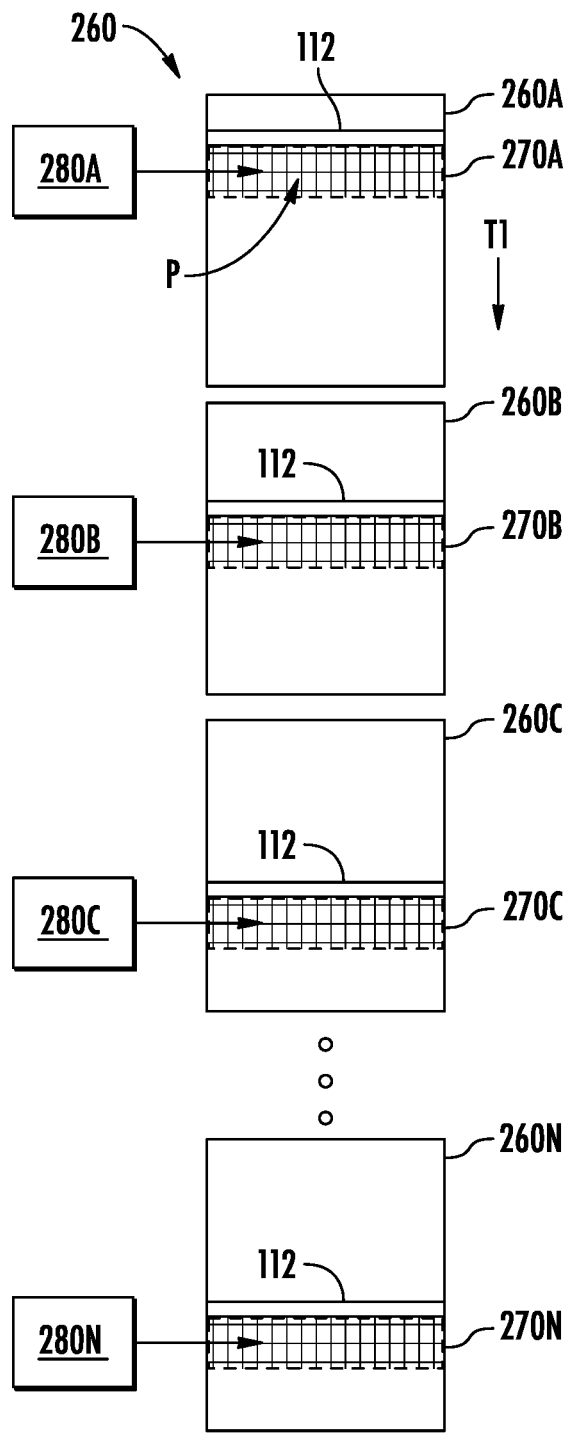
FIG. 19 provides a schematic view of thermal data being applied to pixels of a masked window of each image.

By way of example, FIG. 19 provides a schematic view of thermal data being applied to the pixels of the masked window of each image. As shown, thermal data 280A is applied to pixels P within the masked window 270A positioned on a first captured image 260A, thermal data 280B is applied to pixels P within the masked window 270B positioned on a second captured image 260B, thermal data 280C is applied to pixels P within the masked window 270C positioned on a third captured image 260C, and so on for N number of captured images, wherein N is an integer. Each pixel within a particular masking window can receive thermal data (e.g., receive a temperature value). As depicted, the thermal data 280A, 280B, 280, and 280N is only applied to pixels P within the respective masked windows 270A, 270B, 270C, and 270N of the captured images 260A, 260B, 260C, and 260N. Pixels outside of the masked windows are ignored. Masking the pixels outside of the masked windows can reduce the processing time and computing resources necessary to apply the thermal data to the 2D captured images, among other benefits.

Figure 20:
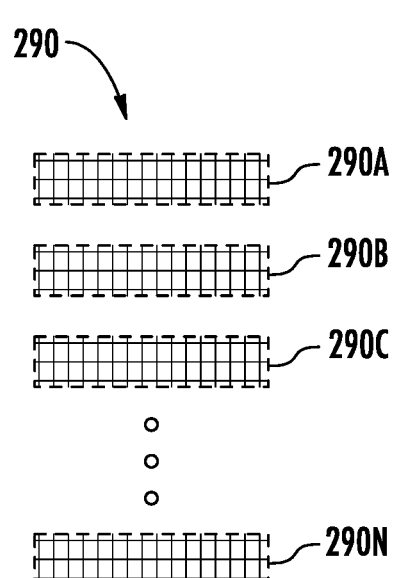
FIG. 20 provides a schematic view of a plurality of generated masked images according to one embodiment of the present disclosure.

FIG. 20 provides a schematic view of a plurality of generated masked images 290. Each generated masked image 290 is representative of the pixels of its associated masked window with thermal data applied thereto. For instance, a first masked image 290A is representative of the pixels P of its associated first masked window 270A with thermal data 280A applied thereto, a second masked image 290B is representative of the pixels P of its associated second masked window 270B with thermal data 280B applied thereto, a third masked image 290C is representative of the pixels P of its associated third masked window 270C with thermal data 280C applied thereto, and so on up to the Nth masked image.

As noted above, it was discovered that thermal transients or anomalies start to appear just forward of the heating element as it traverses relative to the component. Capturing and considering the pixels forward of the heating element can provide valuable insight into determining the maximum temperature value and/or heating rates associated with the pixels. However, as noted, the minimum temperature values and/or cooling rates associated with the pixels can also be considered. As will be appreciated, after the heating element traverses past a particular part of the component, the component begins to cool. To capture the minimum temperature values and/or cooling rates associated with the pixels, in some implementations, the masking window can be positioned backward of the heating element along the traversing direction. It will also be appreciated that a maximum temperature value can be captured within a masking window positioned backward of the heating element. Further, insight into the heating rates associated with the pixels can also be captured within a masking window positioned backward of the heating element.

Figure 21:
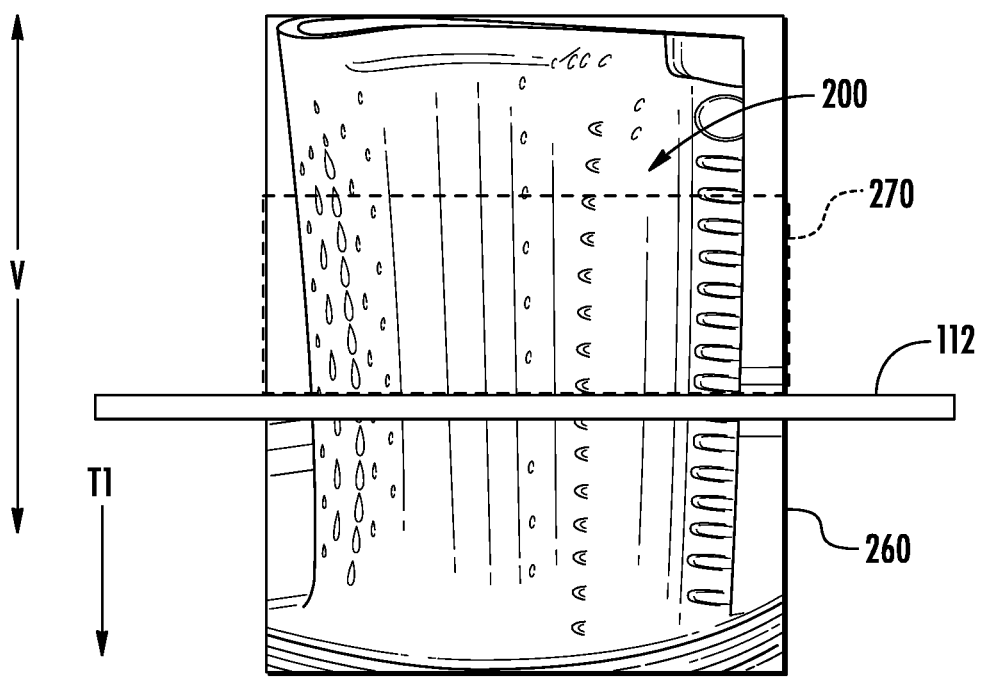
FIG. 21 provides a view of an image of a component captured by an imaging device as a heating element traversed relative to the component along a traversing direction and applied heat thereto and also depicts one example manner in which a masking window can be positioned relative to the heating element.

By way of example, as shown in FIG. 21, the masking window 270 is positioned adjacent to and backward of the heating element 112 along the traversing direction T1 in each captured image (only one captured image 260 is shown in FIG. 21). Accordingly, the masking window 270 of FIG. 21 is positioned to capture the transient thermal response of the component 200 as the component 200 cools. In some implementations, the masking window 270 positioned backward of the heating element 112 along the traversing direction T1 need not be positioned adjacent to the heating element 112; rather, there may be a space between the heating element 112 and the masking window 270, e.g., along the traversing direction T1.

In other implementations, a masking window includes two sections, including a forward section and a back section. In such implementations, the forward section of the masking window is positioned adjacent to and forward of the heating element along the traversing direction in each captured image and the back section of the masking window is positioned adjacent to and backward of the heating element along the traversing direction in each captured image. The forward and back sections can be non-contiguous sections in such implementations.

Figure 22:
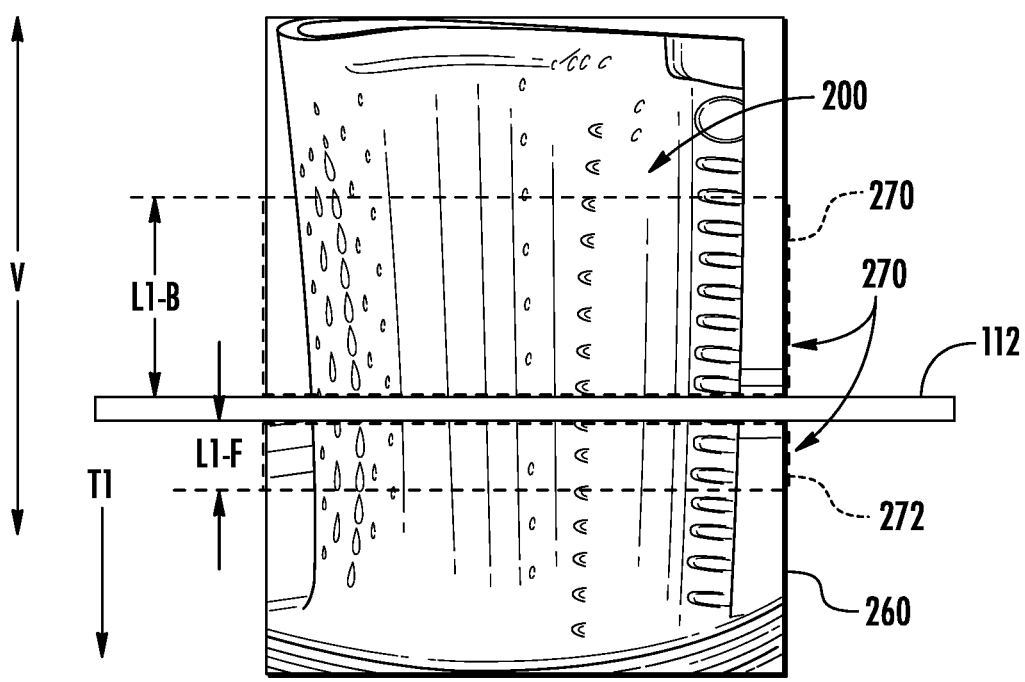
FIG. 22 provides a view of an image of a component captured by an imaging device as a heating element traversed relative to the component along a traversing direction and applied heat thereto and also depicts another example manner in which a masking window can be positioned relative to the heating element.

As another example, as shown in FIG. 22, the masking window 270 includes two sections, including a forward section 272 and a back section 274. In such implementations, the forward section 272 of the masking window 270 is positioned adjacent to and forward of the heating element 112 along the traversing direction T1 in each captured image (only one captured image 260 is shown in FIG. 22) and the back section 274 of the masking window 270 is positioned adjacent to and backward of the heating element 112 along the traversing direction T1 in each captured image. The forward and back sections 272, 274 can be non-contiguous sections as depicted in FIG. 21. Further, in such implementations, the back section 274 can have a length L1-B (e.g., a length extending along the traversing direction T1) that is at least twice the length L1-F (e.g., a length extending along the traversing direction T1) of the forward section 272 of the masking window 270.

In some implementations, the forward section 272 positioned forward of the heating element 112 along the traversing direction T1 need not be positioned adjacent to the heating element 112; rather, there may be a space between the heating element 112 and the forward section 272, e.g., along the traversing direction T1. Additionally or alternatively, in some implementations, the back section 274 positioned backward of the heating element 112 along the traversing direction T1 need not be positioned adjacent to the heating element 112; rather, there may be a space between the heating element 112 and the back section 274, e.g., along the traversing direction T1.

At (406), the method (400) includes determining a minimum and/or maximum value associated with each pixel over the plurality of masked images based at least in part on the applied thermal data. That is, considering all thermal data values for a particular pixel, the minimum and/or maximum value is determined for that particular pixel. In some implementations, the minimum and/or maximum value is a minimum and/or maximum temperature value. In some implementations, determining the minimum and/or maximum value associated with each pixel over the plurality of masked images at (406) includes determining, for each pixel in the plurality of masked images, each masked image of the plurality of masked images in which a given pixel in the plurality of masked images is represented and comparing the values associated with the given pixel from each masked image in which the given pixel is represented. To determine a minimum value, the value associated with the given pixel that is least is selected as the minimum value associated with the given pixel. To determine a maximum value, the value associated with the given pixel that is greatest is selected as the maximum value associated with the given pixel.

Figure 23:
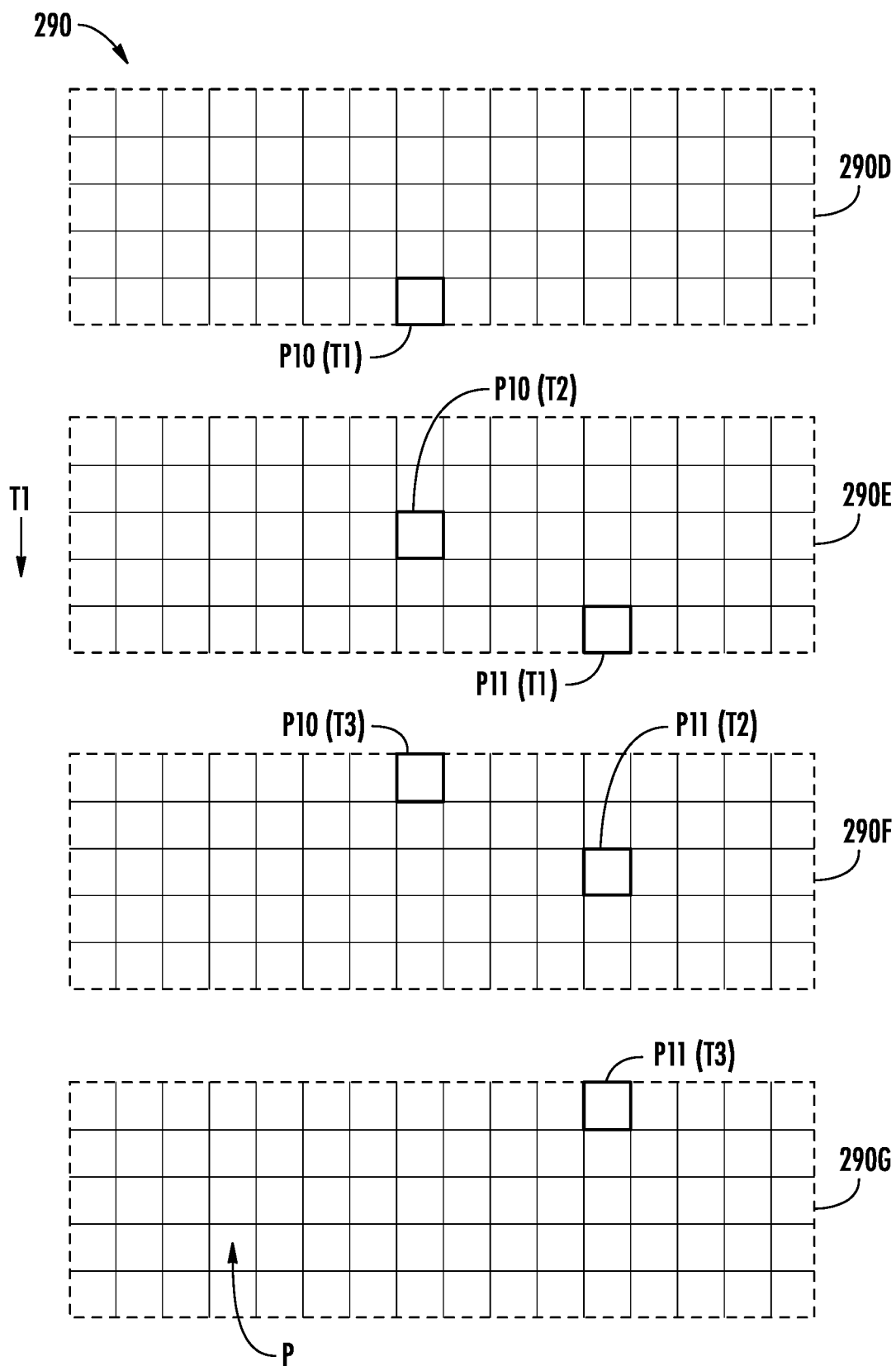
FIG. 23 depicts several masked images according to one embodiment of the present disclosure.

By way of example, FIG. 23 depicts several masked images 290, including a first masked image 290D, a second masked image 290E, a third masked image 290F, and a fourth masked image 290G. The masked images 290D, 290E, 290F, and 290G were created using sequential images captured by the imaging device. Each masked image 290 includes a plurality of pixels P. Some or all the pixels P may be represented in multiple masked images 290. For instance, pixel P10 is represented in multiple masked images 290 as shown.

To determine the maximum value associated with pixel P10 over the plurality of masked images 290, every masked image in which pixel P10 appears is determined. In this example, pixel P10 is found within the perimeter of the first masked image 290D, the second masked image 290E, and the third masked image 290F, but not the fourth masked image 290G. Accordingly, only the first, second, and third masked images 290D, 290E, 290F are considered for determining the maximum value for pixel P10. In the first masked image 290D, pixel P10 has a value (e.g., a temperature value) of T1. In the second masked image 290E, pixel P10 has a value of T2. In the third masked image 290F, pixel P10 has a value of T3. In this example, for pixel P10, T3>T2>T1. Accordingly, for pixel P10, the maximum value is T3. It will be appreciated that a maximum value for each pixel over the plurality of masked images 290 can be determined in the same manner as described for pixel P10. For instance, a maximum value for pixel P11 can be determined in the same manner. In this example, for pixel P11, T2>T3>T1. Accordingly, for pixel P11, the maximum value is determined as T2. Minimum values for pixels can be determined in a similar manner as noted except with using minimum values rather than maximum values.

At (408), the method (400) includes generating the single observation image of the component using the plurality of masked images and such that the determined minimum and/or maximum value associated with each of the pixels in the plurality of masked images is represented in the single observation image. For instance, the one or more processors of the computing system 160 can generate the single observation image. In some implementations, the one or more processors of the computing system 160 can generate a single observation image such that that the determined maximum values associated with each of the pixels in the plurality of masked images is represented in the single observation image. In other implementations, the one or more processors of the computing system 160 can generate a single observation image such that that the determined minimum values associated with each of the pixels in the plurality of masked images is represented in the single observation image. In yet other implementations, the one or more processors of the computing system 160 can generate two single observation images, including one single observation image representing the determined maximum values and one single observation image representing the determined minimum values.

Figure 24:
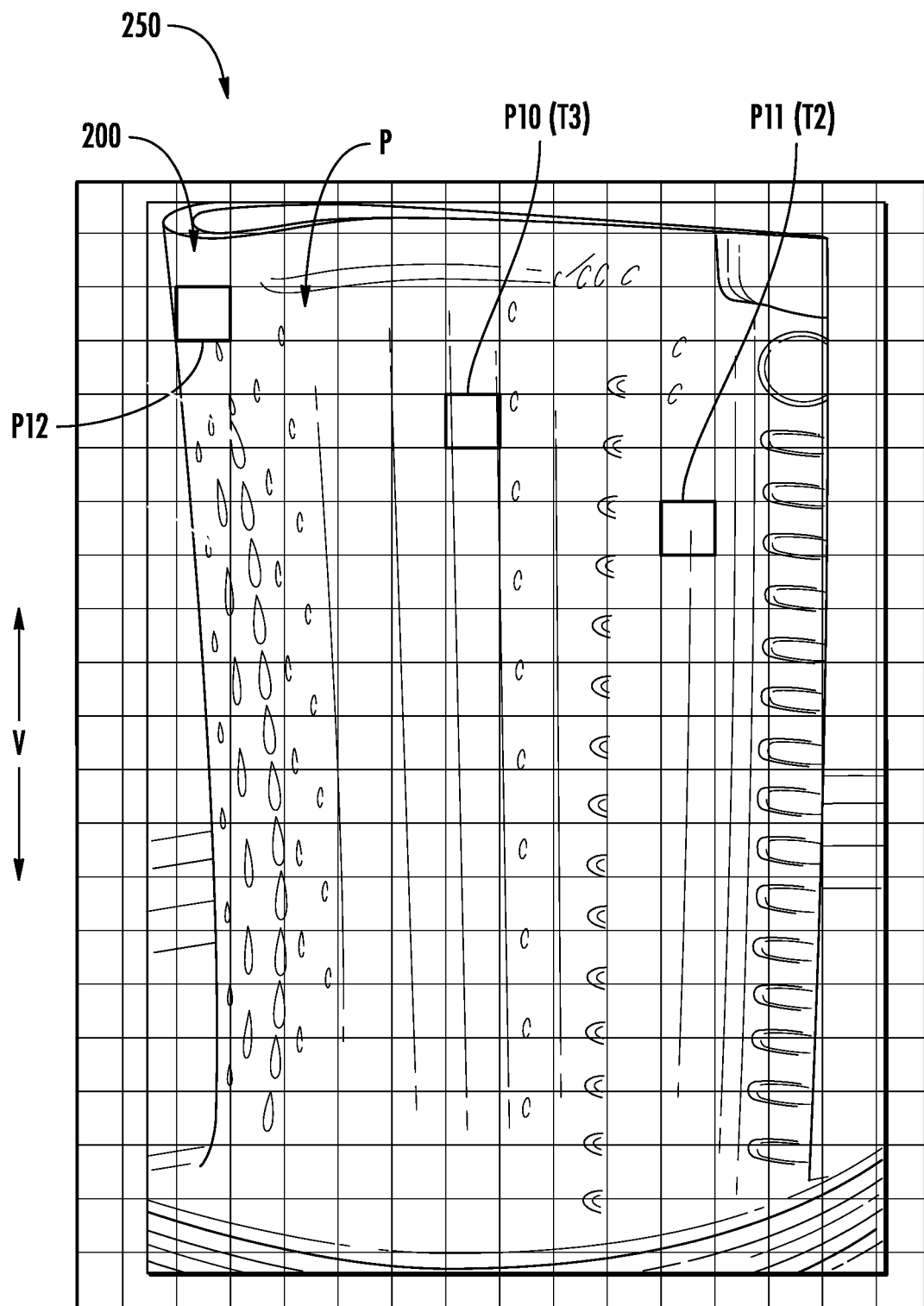
FIG. 24 depicts a single observation image having a plurality of pixels according to one embodiment of the present disclosure.

By way of example, FIG. 24 depicts a generated single observation image 250 having a plurality of pixels P. Notably, the pixels P of the single observation image 250 represent or depict the same respective portions of the component 200 as they did in the masked images 290 and captured images 260. Thus, throughout the single observation image generation process, a particular pixel represents the same portion of the component 200 throughout. For example, pixel P12 may represent a portion of a leading edge of the component 200 in the captured images, in the generated masked images, and in the final single observation image 250 as shown in FIG. 24.

Each pixel P of the single observation image 250 that represents a portion of the component 200 displays its respective portion of the component 200 and the transient thermal response of the component 200. The transient thermal response of the component 200 is represented in the pixels P of the single observation image 250 as the determined maximum value for the respective pixels. For example, the determined maximum value for pixel P10 of the single observation image 250 was determined as T3 (e.g., which was extracted or determined from the third masked image 290F in FIG. 23). Accordingly, the thermal response of the component 200 at pixel P10 is depicted as T3 in the single observation image 250. The determined maximum value for pixel P11 of the single observation image 250 was determined as T2 (e.g., which was extracted or determined from the third masked image 290F in FIG. 23). Accordingly, the thermal response of the component 200 at pixel P11 is depicted or represented as T2 in the single observation image 250. The other pixels P of the single observation image 250 can likewise represent their respective determined maximum values.

Notably, the heating element 112 (FIG. 19) is not present or nearly removed in the generated single observation image 250. As pixels are selected from among the pixels of the masked images 290 to ultimately display their maximum value, the heating element 112 is not present from the single observation image 250. Thus, despite the imaging camera 152 (FIG. 1) capturing the heating element 112 in the plurality of captured images 260 (FIGS. 15-18), the single observation image 250 does not include the footprint of the heating element 112. This may offer a cleaner image and may facilitate detection of defects and analysis of the thermal response of the component 200, e.g., at (314), (316), and 318) of the method (300) described herein.

The technology discussed herein makes reference to computer-based systems and actions taken by and information sent to and from computer-based systems. It will be appreciated that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

1. A system, comprising: a heating element; an imaging system having an imaging device; a computing system having one or more processors and one or more memory devices, the one or more processors configured to: cause the heating element to traverse relative to a component having a coating; cause the heating element to heat the component as the heating element traverses relative to the component; cause the imaging device to capture a plurality of images of the component as the heating element traverses relative to the component and applies heat thereto, the plurality of captured images indicating a transient thermal response of the component; and detect one or more coating defects in the coating of the component based at least in part on the transient thermal response of the component captured in the plurality of images.

2. The system of any preceding clause, wherein the one or more processors are configured to: generate a single image from the plurality of captured images, the single image indicating the one or more detected coating defects in the coating of the component, and wherein the one or more processors detect the one or more coating defects in the coating of the component using the generated single image.

3. The system of any preceding clause, wherein the one or more processors cause the heating element to traverse relative to the component between 2-5 cm/s.

4. The system of any preceding clause, wherein in detecting the one or more coating defects in the coating of the component based at least in part on the transient thermal response of the component captured in the plurality of images, the one or more processors are configured to: identify one or more regions of the coating where the transient thermal response is outside of a predetermined range, and wherein the one or more regions of the coating where the transient thermal response is outside of the predetermined range are identified as the one or more coating defects of the coating.

5. The system of any preceding clause wherein the one or more processors are configured to: determine one or more characteristics of the identified one or more coating defects of the coating; and classify the identified one or more coating defects of the coating based at least in part on the one or more determined characteristics.

6. The system of any preceding clause, wherein in determining the one or more characteristics of the identified one or more coating defects of the coating, the one or more processors are configured to: determine at least one of: a quantity of the identified one or more coating defects of the coating, a depth of each of the identified one or more coating defects of the coating, and an area fraction of the identified one or more coating defects of the coating.

7. The system of any preceding clause, wherein the one or more processors are configured to: determine whether the coating of the component is an acceptable coating based on at least one of the following comparisons: the quantity of the identified one or more coating defects of the coating with a quantity threshold; the depth of each of the identified one or more coating defects of the coating with a depth threshold; and the area fraction of the identified one or more coating defects of the coating with an area fraction threshold.

8. The system of any preceding clause, further comprising: an airflow generator in fluid communication with the component, and wherein the one or more processors are configured to: cause, as the heating element traverses relative to the component and applies heat thereto, the airflow generator to pulse an airflow through one or more interior passages of the component.

9. The system of any preceding clause, wherein the component is a metallic component and the coating is a thermal barrier coating.

10. The system of any preceding clause, wherein the imaging device is at least one of a mid-wavelength imaging camera and a long wavelength imaging camera, wherein the mid-wavelength imaging camera captures wavelengths in a range of about three to six micrometers and the long wavelength imaging camera captures wavelengths in a range of about six to fourteen micrometers.

11. The system of any preceding clause, wherein the imaging device is operatively configured to detect defects as small as 80 microns.

12. A method, comprising: traversing a heating element relative to a component having a coating; heating the component with the heating element as the heating element traverses relative to the component; capturing, with an imaging device, a plurality of images of the component as the heating element traverses relative to the component and applies heat thereto, the captured plurality of images indicating a transient thermal response of the component; and detecting one or more coating defects in the coating of the component based at least in part on the transient thermal response of the component captured in the plurality of images.

13. The method of any preceding clause, further comprising: pulsing an airflow through an interior passage defined by the component as the heating element traverses relative to the component and applies heat thereto.

14. The method of any preceding clause, wherein detecting the one or more coating defects in the coating of the component based at least in part on the transient thermal response of the component captured in the plurality of images comprises: identifying one or more regions of the coating where the transient thermal response is outside of a predetermined range, and wherein the one or more regions of the coating where the transient thermal response is outside of the predetermined range are identified as the one or more coating defects of the coating.

15. The method of any preceding clause, further comprising: generating a single image from the captured plurality of images, the single image indicating the one or more detected coating defects in the coating of the component, and wherein the one or more coating defects are detected in the coating of the component using the generated single image.

16. The method of any preceding clause, further comprising: determining one or more characteristics of the detected one or more coating defects of the coating; and classifying the detected one or more coating defects of the coating based at least in part on the one or more determined characteristics.

17. A non-transitory computer readable medium comprising computer-executable instructions, which, when executed by one or more processors of a computing system of a coating inspection system, cause the one or more processors to: cause a heating element of the coating inspection system to traverse relative to a component having a coating; cause the heating element to heat the component as the heating element traverses relative to the component; cause an imaging device of the coating inspection system to capture a plurality of images of the component as the heating element traverses relative to the component and applies heat thereto, the plurality of captured images indicating a transient thermal response of the component; and detect one or more coating defects in the coating of the component based at least in part on the transient thermal response of the component captured in the plurality of images.

18. The computer readable medium of any preceding clause, wherein the computer-executable instructions, which, when executed by the one or more processors of the computing system of the coating inspection system, further cause the one or more processors to: cause, as the heating element traverses relative to the component and applies heat thereto, an airflow generator in fluid communication with the component to pulse an airflow through one or more interior passages of the component.

19. The computer readable medium of any preceding clause, wherein the computer-executable instructions, which, when executed by the one or more processors of the computing system of the coating inspection system, further cause the one or more processors to: generate a single image from the plurality of captured images, the single image indicating the one or more detected coating defects in the coating of the component, and wherein the one or more processors detect the one or more coating defects in the coating of the component using the generated single image.

20. The computer readable medium of any preceding clause, wherein the heating element traverses relative to the component and applies heat thereto without contacting the component.

What is claimed is:

1. A system, comprising:
    a heating element;
    an airflow generator in fluid communication with a component, the component having a coating and comprising one or more interior passages;
    an imaging system having an imaging device;
    a computing system having one or more processors and one or more memory devices, the one or more processors configured to:
        cause the heating element to traverse relative to the component;
        cause the heating element to heat the component as the heating element traverses relative to the component;
        cause, as the heating element traverses relative to the component and applies heat thereto, the airflow generator to pulse an airflow through the one or more interior passages of the component;
        cause the imaging device to capture a plurality of images of the component as the heating element traverses relative to the component and applies heat thereto, the plurality of images indicating a transient thermal response of the component; and
        detect one or more coating defects in the coating of the component based at least in part on the transient thermal response of the component captured in the plurality of images.

2. The system of claim 1, wherein the one or more processors are configured to:
    generate a single image from the plurality of images, the single image indicating the one or more coating defects in the coating of the component, and
    wherein the one or more processors detect the one or more coating defects in the coating of the component using the single image.

3. The system of claim 1, wherein the one or more processors cause the heating element to traverse relative to the component between 2-5 cm/s.

4. The system of claim 1, wherein in detecting the one or more coating defects in the coating of the component based at least in part on the transient thermal response of the component captured in the plurality of images, the one or more processors are configured to:
    identify one or more regions of the coating where the transient thermal response is outside of a predetermined range, and
    wherein the one or more regions of the coating where the transient thermal response is outside of the predetermined range are identified as the one or more coating defects of the coating.

5. The system of claim 4, wherein the one or more processors are configured to:
    determine one or more characteristics of the one or more coating defects of the coating; and
    classify the one or more coating defects of the coating based at least in part on the one or more characteristics.

6. The system of claim 4, wherein in determining the one or more characteristics of the one or more coating defects of the coating, the one or more processors are configured to:
    determine at least one of: a quantity of the one or more coating defects of the coating, a depth of each of the one or more coating defects of the coating, and an area fraction of the one or more coating defects of the coating.

7. The system of claim 6, wherein the one or more processors are configured to:
    determine whether the coating of the component is an acceptable coating based on at least one of the following comparisons:
        the quantity of the one or more coating defects of the coating with a quantity threshold;
        the depth of each of the one or more coating defects of the coating with a depth threshold; and
        the area fraction of the one or more coating defects of the coating with an area fraction threshold.

8. The system of claim 1,
    wherein the one or more processors are configured to:
        cause, as the heating element traverses relative to the component and applies heat thereto, the airflow generator to pulse an airflow through the one or more interior passages of the component at a frequency in a range of $10^{-2}$ Hz to $10^2$ Hz.

9. The system of claim 1, wherein the component is a metallic component and the coating is a thermal barrier coating.

10. The system of claim 1, wherein the imaging device is at least one of a mid-wavelength imaging camera and a long wavelength imaging camera, wherein the mid-wavelength imaging camera captures wavelengths in a range of about three to six micrometers and the long wavelength imaging camera captures wavelengths in a range of about six to fourteen micrometers.

11. The system of claim 1, wherein the imaging device is operatively configured to detect defects as small as 80 microns.

12. A method, comprising:
    traversing a heating element relative to a component having a coating;
    heating the component with the heating element as the heating element traverses relative to the component;
    pulsing an airflow through an interior passage defined by the component as the heating element traverses relative to the component and applies heat thereto;
    capturing, with an imaging device, a plurality of images of the component as the heating element traverses relative to the component and applies heat thereto, the captured plurality of images indicating a transient thermal response of the component; and
    detecting one or more coating defects in the coating of the component based at least in part on the transient thermal response of the component captured in the plurality of images.

13. The method of claim 12, further comprising:
    pulsing an airflow through an interior passage defined by the component at a frequency in a range of $10^{-2}$ Hz to $10^2$ Hz as the heating element traverses relative to the component and applies heat thereto.

14. The method of claim 12, wherein detecting the one or more coating defects in the coating of the component based at least in part on the transient thermal response of the component captured in the plurality of images comprises:
- identifying one or more regions of the coating where the transient thermal response is outside of a predetermined range, and
- wherein the one or more regions of the coating where the transient thermal response is outside of the predetermined range are identified as the one or more coating defects of the coating.

15. The method of claim 12, further comprising:
- generating a single image from the plurality of images, the single image indicating the one or more coating defects in the coating of the component, and wherein the one or more coating defects are detected in the coating of the component using the single image.

16. The method of claim 12, further comprising:
- determining one or more characteristics of the one or more coating defects of the coating; and
- classifying the one or more coating defects of the coating based at least in part on the one or more characteristics.

17. A non-transitory computer readable medium comprising computer-executable instructions, which, when executed by one or more processors of a computing system of a coating inspection system, cause the one or more processors to:
- cause a heating element of the coating inspection system to traverse relative to a component having a coating;
- cause the heating element to heat the component as the heating element traverses relative to the component;
- cause, as the heating element traverses relative to the component and applies heat thereto, an airflow generator to pulse an airflow through one or more interior passages of the component;
- cause an imaging device of the coating inspection system to capture a plurality of images of the component as the heating element traverses relative to the component and applies heat thereto, the plurality of images indicating a transient thermal response of the component; and
- detect one or more coating defects in the coating of the component based at least in part on the transient thermal response of the component captured in the plurality of images.

18. The non-transitory computer readable medium of claim 17, wherein the computer-executable instructions, which, when executed by the one or more processors of the computing system of the coating inspection system, further cause the one or more processors to:
- cause, as the heating element traverses relative to the component and applies heat thereto, an airflow generator in fluid communication with the component to pulse an airflow through the one or more interior passages of the component at a frequency $10^{-2}$ Hz to $10^2$ Hz.

19. The non-transitory computer readable medium of claim 17, wherein the computer-executable instructions, which, when executed by the one or more processors of the computing system of the coating inspection system, further cause the one or more processors to:
- generate a single image from the plurality of images, the single image indicating the one or more coating defects in the coating of the component, and
- wherein the one or more processors detect the one or more coating defects in the coating of the component using the single image.

20. The non-transitory computer readable medium of claim 17, wherein the heating element traverses relative to the component and applies heat thereto without contacting the component.

* * * * *